(12) United States Patent
Tatarka et al.

(10) Patent No.: US 11,577,443 B2
(45) Date of Patent: Feb. 14, 2023

(54) INJECTION STRETCH BLOW-MOLDING (ISBM) ENHANCEMENT FOR SEMI-CRYSTALLINE POLYOLEFIN CONTAINERS UTILIZING ALICYCLIC POLYOLEFINS

(71) Applicant: Polyplastics USA, Inc., Farmington Hills, MI (US)

(72) Inventors: Paul D. Tatarka, Union, KY (US); Timothy M. Kneale, Florence, KY (US)

(73) Assignee: Polyplastics USA, Inc, Farmington Hills, MI (US)

( * ) Notice: Subject to any disclaimer, the term of this patent is extended or adjusted under 35 U.S.C. 154(b) by 804 days.

(21) Appl. No.: 16/078,536

(22) PCT Filed: Feb. 27, 2017

(86) PCT No.: PCT/US2017/019571
§ 371 (c)(1),
(2) Date: Aug. 21, 2018

(87) PCT Pub. No.: WO2017/155712
PCT Pub. Date: Sep. 14, 2017

(65) Prior Publication Data
US 2021/0189107 A1    Jun. 24, 2021

Related U.S. Application Data

(60) Provisional application No. 62/306,660, filed on Mar. 11, 2016.

(51) Int. Cl.
*B29C 49/00* (2006.01)
*B29C 49/06* (2006.01)
(Continued)

(52) U.S. Cl.
CPC .......... *B29C 49/0005* (2013.01); *B29C 49/02* (2013.01); *B29C 49/06* (2013.01);
(Continued)

(58) Field of Classification Search
None
See application file for complete search history.

(56) References Cited

U.S. PATENT DOCUMENTS 3,333,024 A   7/1967   Haefele et al.
4,196,154 A   4/1980   Tung et al.
(Continued)

FOREIGN PATENT DOCUMENTS

CA    2055397 C    4/2004
DE    109225       10/1974
(Continued)

OTHER PUBLICATIONS

Lamonte, Ronald R., and Donal McNally. "Cyclic olefin copolymers." Advanced Materials and Processes 159.3 (Mar. 2001): 33-36. (Year: 2001).*

(Continued)

*Primary Examiner* — Benjamin A Schiffman
(74) *Attorney, Agent, or Firm* — Michael Ferrell

(57) ABSTRACT

An injection stretch blow-molded (ISBM) container prepared by way of injection molding a tubular preform followed by reheating and concurrently stretching and blow-molding the heated preform into the container. The container and preform comprise from 70 wt. % to 97.5 wt. % of a semi-crystalline polyolefin composition comprising one or polymers selected from polyethylene polymers and polypropylene polymers and from 2.5 wt. % to 30 wt. % of an alicyclic polyolefin composition, wherein the alicyclic polyolefin composition has a glass transition temperature, Tg, of from 80° to 145° C.

12 Claims, 15 Drawing Sheets

(51) Int. Cl.
*B29C 49/02* (2006.01)
*C08L 23/08* (2006.01)
*B29C 49/12* (2006.01)
*B29K 23/00* (2006.01)
*B29L 31/00* (2006.01)
*B65D 1/02* (2006.01)
*C08L 23/06* (2006.01)

(52) U.S. Cl.
CPC .......... *C08L 23/0823* (2013.01); *B29C 49/12* (2013.01); *B29C 2049/024* (2013.01); *B29K 2023/06* (2013.01); *B29K 2023/065* (2013.01); *B29K 2023/08* (2013.01); *B29K 2023/12* (2013.01); *B29K 2023/38* (2013.01); *B29L 2031/7158* (2013.01); *B65D 1/0207* (2013.01); *C08L 23/06* (2013.01); *C08L 2207/062* (2013.01)

(56) References Cited

U.S. PATENT DOCUMENTS

| | | | |
|---|---|---|---|
| 4,200,718 | A | 4/1980 | Tung et al. |
| 5,087,677 | A | 2/1992 | Brekner et al. |
| 5,352,744 | A | 10/1994 | Bates et al. |
| 5,494,969 | A | 2/1996 | Abe et al. |
| 5,612,422 | A | 3/1997 | Hucul et al. |
| 5,645,253 | A | 7/1997 | Hoshino |
| 5,648,443 | A | 7/1997 | Okamoto et al. |
| 5,693,728 | A | 12/1997 | Okamoto et al. |
| 5,912,070 | A | 6/1999 | Miharu et al. |
| 5,954,224 | A * | 9/1999 | Berger ............... B65D 1/0207 220/666 |
| 6,008,298 | A | 12/1999 | Hatke et al. |
| 6,068,936 | A | 5/2000 | Peiffer et al. |
| 6,489,016 | B2 | 12/2002 | Kishine |
| 6,544,610 | B1 | 4/2003 | Minami et al. |
| 7,871,558 | B2 | 1/2011 | Merical et al. |
| 9,103,966 | B2 | 8/2015 | Lin et al. |
| 9,272,456 | B2 | 3/2016 | Etesse |
| 9,452,593 | B2 * | 9/2016 | Tatarka ............... B32B 27/325 |
| 2002/0088767 | A1 | 7/2002 | Saito et al. |
| 2003/0207061 | A1 | 11/2003 | Hayashi et al. |
| 2006/0255049 | A1 | 11/2006 | McCarthy et al. |
| 2012/0245307 | A1 | 9/2012 | Slawinski |
| 2012/0252988 | A1 | 10/2012 | Slawinski |
| 2012/0282422 | A1 | 11/2012 | Boissiere et al. |
| 2013/0192173 | A1 | 8/2013 | Boissiere et al. |
| 2014/0004285 | A1 | 1/2014 | Boissiere et al. |
| 2014/0050873 | A1 | 2/2014 | Vantomme et al. |
| 2016/0326353 | A1 * | 11/2016 | Prades ............... C08L 23/06 |
| 2019/0002178 | A1 * | 1/2019 | Tatarka ............... B65D 81/28 |

FOREIGN PATENT DOCUMENTS

| | | | | |
|---|---|---|---|---|
| EP | 0407870 | A2 | 1/1991 | |
| EP | 0485893 | A1 | 5/1992 | |
| EP | 0504418 | A1 | 9/1992 | |
| EP | 0818472 | A2 | 1/1998 | |
| EP | 2891680 | A1 | 7/2015 | |
| ES | 2621732 | T3 * | 7/2017 | ............... C08J 5/00 |
| JP | H0597933 | A | 4/1993 | |
| JP | H0753794 | A | 2/1995 | |
| WO | 2011111742 | A1 | 9/2011 | |
| WO | WO-2011131322 | A1 * | 10/2011 | ............... C08L 23/06 |
| WO | 2014141817 | A1 | 9/2014 | |
| WO | WO-2015101667 | A1 * | 7/2015 | ............... C08L 23/06 |

OTHER PUBLICATIONS

Taglialatela Scafati, S., et al. "Modulation of barrier properties of monolayer films from blends of polyethylene with ethylene-co-norbornene." Journal of Applied Polymer Science 121.5 (Mar. 30, 2011): 3020-3027. (Year: 2011).*

Keum, Jong Kahk, et al. "Probing flow-induced precursor structures in blown polyethylene films by synchrotron X-rays during constrained melting." Macromolecules 38.12 (May 18, 2005): 5128-5136. (Year: 2005).*

Trombley, Kurt. "Cyclic olefin copolymer: An Alternative plastic film for pharmaceutical blister packages." (Jun. 7, 2001). (Year: 2001).*

Simon, Christian. "Oxygen and water vapor permeability and required layer thickness for barrier packaging." (Sep. 8, 2014). (Year: 2014).*

Durmus, Ali, Mine B. Alanalp, and Ismail Aydin. "Investigation of morphological, rheological, and mechanical properties of cyclic olefin copolymer/poly (ethylene-co-vinyl acetate) blend films." Journal of Plastic Film & Sheeting 34.2 (May 17, 2017): 140-159. (Year: 2017).*

Shamsoddini-Zarch et al. "Effects of different molecular architectures in terms of comonomer content and composition distribution on the miscibility of cyclic olefin copolymer/polyolefin (COC/POE and COC/LLDPEB) blends." Iranian Polymer Journal 30.6 (Apr. 7, 2021): 593-612 (Year: 2021).*

Tatarka, Paul D. "Enhancement of Appearance, Stiffness, and Toughness of Olefinic Blown Films with Cyclic Olefin Copolymers." (May 8, 2017). (Year: 2017).*

Brandau, O., Stretch Blow Moulding, 3rd Ed., 2017: Chapter 2, pp. 18-21; Chapter 4, pp. 49-57; Chapter 6, pp. 81-89; Chapter 9, pp. 140-145; Elsevier.

European Search Report dated Dec. 12, 2019.

* cited by examiner

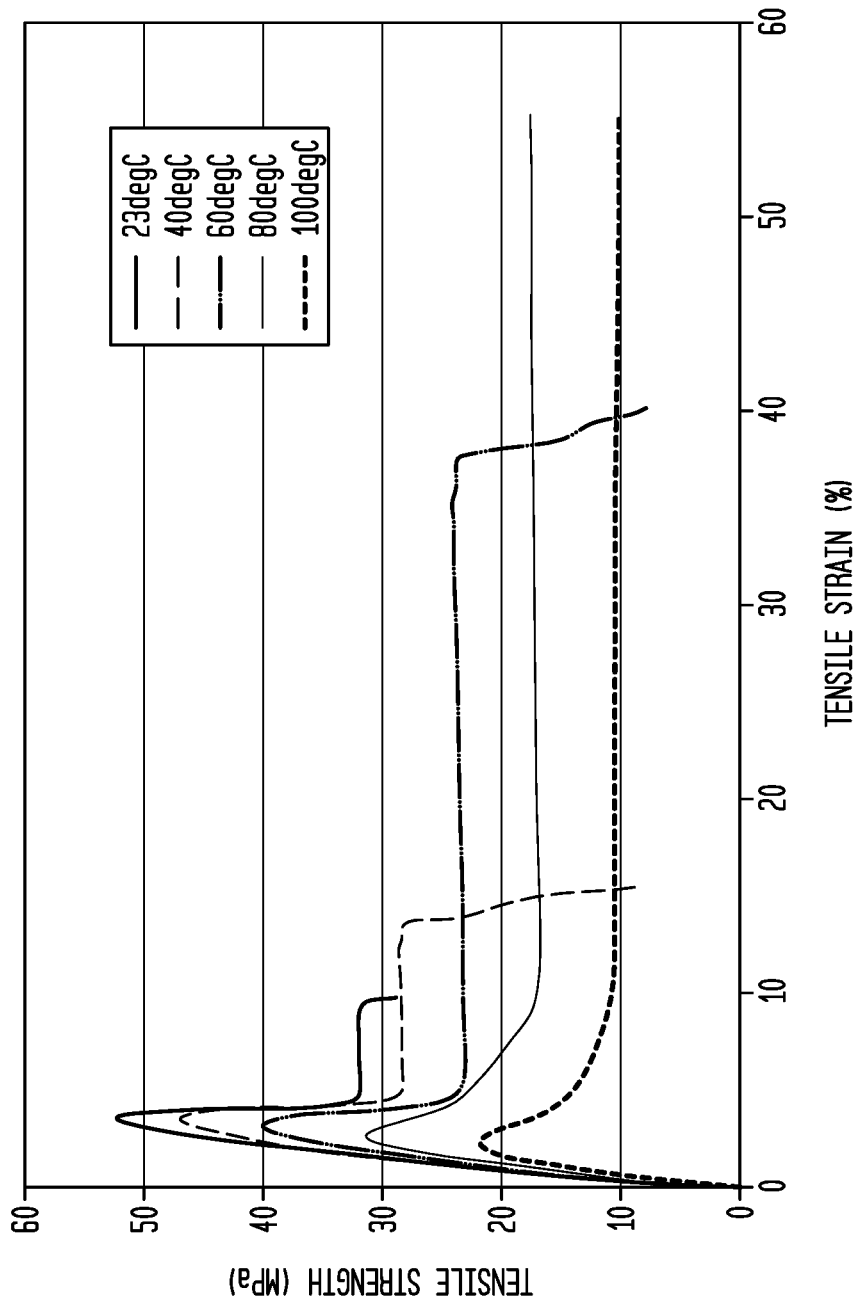

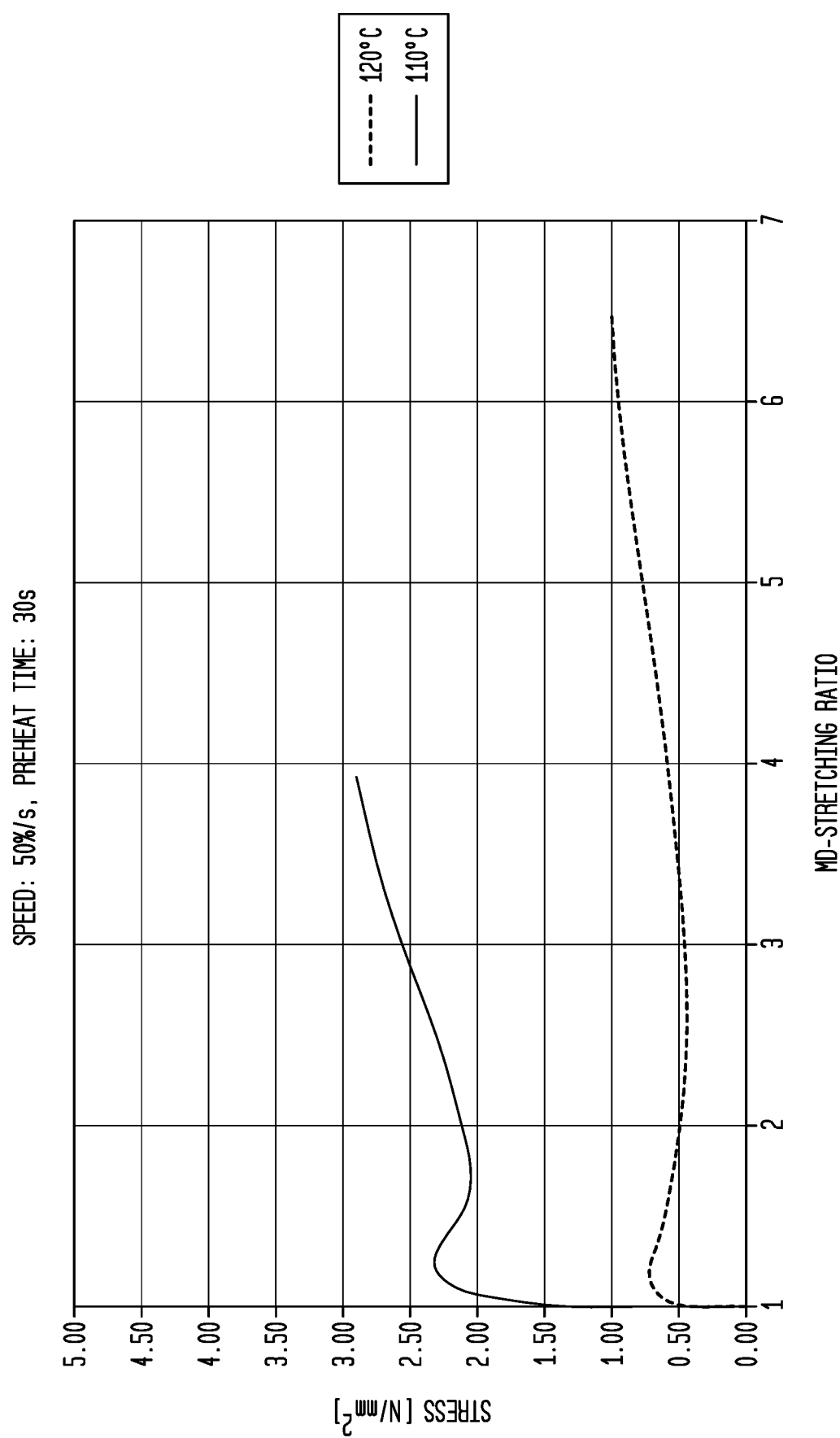

20 OZ BOSTON ROUND BOTTLE

34 OZ DAIRY BOTTLE

SAMPLES COLLECTED OVER PROCESS WINDOW FOR HDPE WITH 17% COC 110

INJECTION STRETCH BLOW-MOLDING (ISBM) ENHANCEMENT FOR SEMI-CRYSTALLINE POLYOLEFIN CONTAINERS UTILIZING ALICYCLIC POLYOLEFINS

CLAIM FOR PRIORITY

This application is based on International Application No. PCT/US17/19571 filed Feb. 27, 2017 entitled Injection Stretch Blow-Molding (ISBM) Enhancement for Semi-Crystalline Polyolefin Containers Utilizing Alicyclic Polyolefins. International Application No. PCT/US17/19571 is based on U.S. Provisional Application No. 62/306,660, filed Mar. 11, 2016, entitled Injection Stretch Blow-Molding (ISBM) Enhancement for HDPE Containers Utilizing Amorphous Cycloolefin Polymers. The priorities of International Application No. PCT/US17/19571 and U.S. Provisional Application No. 62/306,660 are hereby claimed and their disclosures incorporated herein by reference.

TECHNICAL FIELD

The present invention relates generally to the use of alicyclic polyolefins for making injection stretch blow molded containers composed primarily of semi-crystalline polyethylene or polypropylene polymers. An alicyclic polyolefin composition, which includes a cycloolefin polymer, a cycloolefin copolymer or a cyclic block copolymer, is melt blended or layered with the semi-crystalline polyolefin in a preform to provide superior processability to the preform for ISBM. In one preferred embodiment, the container is made primarily from high density polyethylene (HDPE) and a lesser amount of amorphous cycloolefin copolymer.

BACKGROUND OF THE INVENTION

Monolayer extrusion blow-molding (EBM) of HDPE containers have reached practical limits for light-weighting, that is, reduction of container weight without sacrificing performance. HDPE container manufacturers, for applications such as shampoo and soap bottles, face considerable commercial pressure to lower cost (PET containers may be less expensive), improve performance and improve sustainability, which encompasses container weight reduction, enhanced recyclability and recovery and increased recycle content in new containers.

Polyethylene terephthalate (PET) containers, such as soda and water bottles, are manufactured by way of ISBM. ISBM offers many advantages versus EBM, especially considerably faster production time, significant light-weighting and greater toughness.

ISBM is practiced in so called single-step and two-step processes. In a single-step process, preforms are injection molded, cooled and conditioned, reheated and blown into a bottle on one machine. In a two-step process, (also called reheat stretch blow-molding), preforms are injection molded and cooled. Preforms are taken to a second machine where they are reheated and blown into bottles. PET has crystalline structure which enables PET polymer to strain harden well at elevated temperatures during the stretch and blow process. HDPE is also a crystalline polymer, but it does not strain harden at the required stretch and blow process temperature window of 120° C.-130° C. HDPE melts just above these temperatures. Lack of strain hardening of the HDPE con- strains the blow-molding process window and prevents efficient manufacture of HDPE containers using this method.

While the ISBM process has met with tremendous commercial success for making PET containers, one skilled in the art appreciates that semi-crystalline polyethylenes including HDPE generally lack strain hardening behavior which is critical to efficient ISBM processing. See Brandau, O., Stretch Blow Moulding, $3^{rd}$ Ed., Chapter 2, pp. 18-20, Elsevier, 2017.

Blends of bimodal HDPE and cycloolefin copolymers have been disclosed for injection molding applications, See EP 2 891 680 A1; however, their potential in connection with ISBM processes and products has not been realized.

Manufacturers have explored ISBM of bimodal HDPE with somewhat better success than typical unimodal HDPE as is seen in United States Patent Application Publication No. US 2012/0282422, entitled "Bimodal Polyethylene for Injection Stretch Blow Moulding Applications", of Boissiere et al. However, the HDPE ISBM process window is too narrow to enable the required container quality and prevents widespread commercial adoption.

While there has been passing disclosure of the use of cycloolefin polymers in connection with ISBM processes and semicrystalline olefins, little practical guidance and indeed no recognition at all of the potential of amorphous cycloolefin polymers to improve polyethylene or polypropylene ISBM container manufacture exists in the literature. United States Patent Application Publication No. US 2006/02550499, entitled "Stretch Blow-Molded Stackable Tumbler", of McCarthy et al. mentions stretch blow-molding with blends of polyethylenes in general but provides no specifics or examples. Note ¶[0064]. Likewise, U.S. Pat. No. 6,544,610, entitled "Container and Blow-Molded Product", to Minami et al. discloses a layered product with PE/cycloolefin polymer. See Abstract. U.S. Pat. No. 7,871,558, entitled "Container Intended for Moisture-Sensitive Products", to Merical et al. is relevant to layered products as well; while United States Patent Application Publication No. US 2002/0088767, entitled "Plastic Bottle and Method of Producing the Same", of Saito et al. is of more general interest. See also U.S. Pat. No. 9,272,456 to Etesse which discloses ISBM polyethylene containers.

SUMMARY OF THE INVENTION

It has been found in accordance with the present invention that judicious use of alicyclic polyolefins with semi-crystalline polyolefins such as HDPE offers a solution to the problem of processing semi-crystalline polyolefins by way of ISBM. Alicyclic polyolefin polymers can provide sufficient plastic deformation resistance to the re-heated semi-crystalline polyolefin preform at ISBM processing temperatures before and during stretching. It is seen in the disclosure which follows that alicyclic polyolefins layered with semi-crystalline polyethylenes exhibit strain hardening. Amorphous COC, for example, remains rubbery, and highly ductile in the melt above its Tg anywhere from 15° C. above its Tg up to perhaps 70° C. above the Tg of the amorphous cycloolefin polymer. The results of using alicyclic polyolefins with polyethylenes and polypropylenes in connection with ISBM are both unexpected and dramatic.

Referring to FIG. 1A, there is illustrated the processing window of an HDPE/COC preform and an HDPE preform of the same HDPE material. The processing window is expressed in % power to the infra-red (IR) heat lamps in a two-step ISBM machine. It is seen that the HDPE/COC preform is shaped into containers over a processing window of 64%-82% of full power to the heating lamps, while the HDPE preform had a narrow processing window of from 70%-72% of full power. The HDPE/COC preform also provides much better material distribution when made into the container as is seen in FIG. 1B which illustrates wall thickness standard deviation for HDPE/COC containers and HDPE containers made on the same machine. It is seen that the standard deviation in wall thickness for the HDPE/COC containers is less than half that of corresponding HDPE containers. See Example Series 3 for details, as well as FIG. 12.

There is thus provided in accordance with the invention an injection stretch blow-molded container prepared by way of injection molding a tubular preform followed by reheating and concurrently stretching and blow-molding the heated preform into the container, the container and preform comprising from 70 wt. % to 97.5 wt. % of a semi-crystalline polyolefin composition comprising one or more polymers selected from polyethylene polymers and polypropylene polymers and from 2.5 wt. % to 30 wt. % of an alicyclic polyolefin composition, wherein the alicyclic polyolefin composition has a glass transition temperature, Tg, of from 80° to 145° C.

Without intending to be bound by any particular theories, it is believed that a carefully selected alicyclic polyolefin polymer provides sufficient plastic deformation resistance to a semi-crystalline polymer preform and/or enhances strain hardening, which is effective to improve both the processing window and product quality. The alicyclic polyolefin will remain rubbery as temperature is increased at least from 5° C. to 40° C. above its Tg, to provide sufficient plastic deformation resistance and perhaps strain hardening depending on content and preform configuration to enable fast and efficient stretch and blow. Alicyclic polyolefin polymer orients very well and can exhibit strain hardening behavior, making the preform far more robust under blow-molding conditions. Alicyclic polyolefin polymer may change the crystallinity of crystalline polyolefins. Consequences may include better container moisture barrier, better chemical resistance than polyethylene terephthalate and other improved properties. So also, alicyclic polyolefins impart better processing characteristics to a partially crystalline polyolefin article and may result in better product quality in terms of gloss and clarity.

The superior characteristics of the COC/polyolefin preforms are believed due, in part, to the fact that amorphous cycloolefin copolymer compositions are relatively ductile as temperature increases. There is shown in FIG. 2 a plot of tensile strength versus strain for a COC grade with a Tg of 110° C. at various temperatures. It is seen that as temperature increases, the material becomes significantly more ductile at temperatures above 40° C. or so. The elastic modulus of COC is higher than that of HDPE (FIG. 3) and it is seen that when the materials are combined, the combined material exhibits a higher elastic modulus than HDPE over temperatures of interest in practicing ISBM. The amorphous cycloolefin material thus provides the necessary stretch resistance to the material to broaden the processing window and provide better quality moldings. The strain hardening behavior of layered alicyclic polyolefins/semi-crystalline polyethylenes is seen in FIGS. 8-10.

ISBM containers made from semi-crystalline polyolefins modified with alicyclic polyolefin polymer offer at least five compelling advantages: (i) significant light-weighting of product; (ii) faster production rates relative to EBM; (iii) satisfy demanding sustainability especially recycling initiatives; (iv) provides improved appearance by improving clarity/possibly changing crystallization of the semi-crystalline polyolefins; and (v) impart better chemical resistance than PET without higher cost.

Cycloolefin/ethylene copolymers are especially advantageous in connection with polyethylenes because these copolymers are chemically similar, blend well and adhere to polyethylene and do not need to be separated for purposes of recycling.

Still further features and advantages will become apparent from the discussion which follows.

BRIEF DESCRIPTION OF DRAWINGS

The invention is described in detail below with reference to the Figures in which:

FIG. 2 is a plot of tensile strength versus strain for COC with a Tg of 110° C. at various temperatures;

FIG. 10 is a plot of Stress vs TD Stretch for a multilayer structure of PE/COC-78/PE/COC-78/PE at two stretching temperatures;

DETAILED DESCRIPTION OF THE INVENTION

Figure 1A:
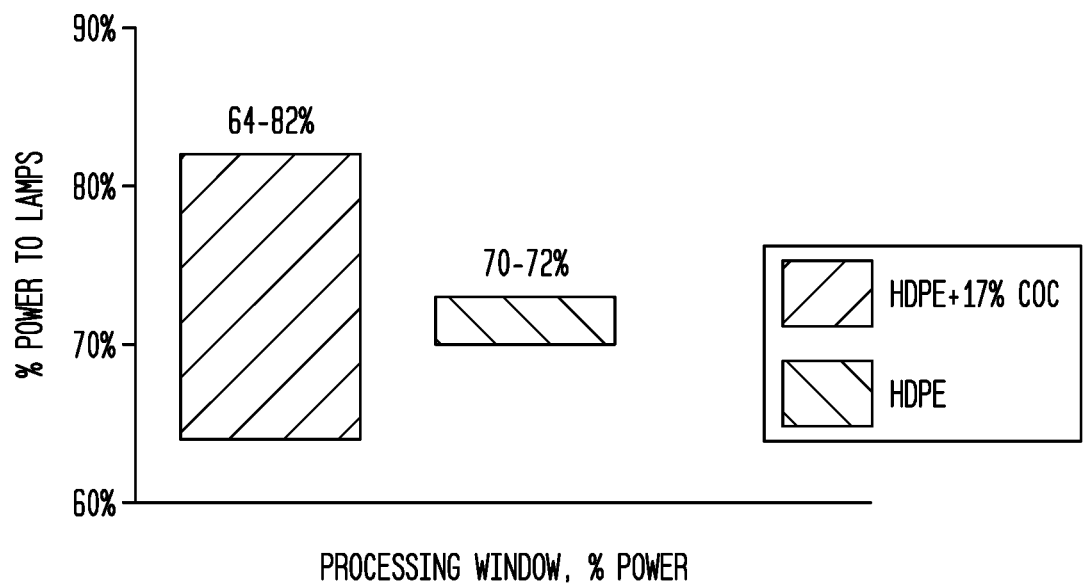
FIG. 1A is a histogram representing the processing window of a preform comprising 17 wt % COC and 83 wt % of bimodal HDPE, as well as the processing window of a preform consisting of bimodal HDPE.

The invention is described below with reference to numerous embodiments. Such discussion is for purposes of illustration only. Modifications to particular examples within the spirit and scope of the present invention, set forth in the appended claims, will be readily apparent to one of skill in the art. Terminology used herein is given its ordinary meaning consistent with the exemplary definitions set forth immediately below; % means weight percent or mol % as indicated, or in the absence of an indication, refers to weight percent. mils refers to thousandths of an inch and so forth.

"Alicyclic polyolefin composition" and like terminology means a composition including a CBC polymer, a COC polymer or a COP polymer. Preferably, an alicyclic polyolefin composition consists essentially of CBC, COC and COP material.

An "amorphous alicyclic polyolefin composition" means an alicyclic polyolefin composition including one or more amorphous or substantially amorphous CBC, COC or COP polymers. Preferably, the amorphous alicyclic polyolefin composition consists essentially of one or more amorphous or substantially amorphous CBC, COC or COP polymers.

"Amorphous cycloolefin polymer" and like terminology refers to a COP or COC polymer which exhibits a glass transition temperature, but does not exhibit a crystalline melting temperature nor does it exhibit a clear x-ray diffraction pattern.

"Amorphous cycloolefin polymer composition" and like terminology refers to a composition containing one or more amorphous cycloolefin polymers. Preferably, an amorphous cycloolefin polymer composition consists essentially of one or more amorphous cycloolefin polymers.

"Blow-molding temperature" and like terminology as used herein refers to the skin temperature of a preform measured immediately before the blow-mold closes and the preform is subsequently stretched and blow-molded. The skin temperature is preferably measured using an infra-red (IR) probe at the middle of the preform, i.e. at 50% of its height.

"CBC polymer" and like terminology refers to cyclic block copolymers prepared by hydrogenating a vinyl aromatic/conjugated diene block copolymer as hereinafter described.

A "substantially amorphous" CBC material means that at least 95 mol % of the vinyl aromatic double bonds are hydrogenated and at least 97 mol % of the double bonds in the diene blocks are hydrogenated.

"COC" polymer and like terminology refers to a cycloolefin copolymer prepared with acyclic olefin monomer such as ethylene or propylene and cycloolefin monomer by way of addition copolymerization.

"COP polymer" and like terminology refers to a cycloolefin containing polymer prepared exclusively from cycloolefin monomer, typically by ring opening polymerization.

"Consisting essentially of" and like terminology refers to the recited components and excludes other ingredients which would substantially change the basic and novel characteristics of the composition or article. Unless otherwise indicated or readily apparent, a composition or article consists essentially of the recited components when the composition or article includes 90% or more by weight of the recited components. That is, the terminology excludes more than 10% unrecited components.

"Glass transition temperature" or Tg, of a composition refers to the temperature at which a composition transitions from a glassy state to a viscous or rubbery state. Glass transition temperature may be measured in accordance with ASTM D3418 or equivalent procedure.

"Melting temperature" refers to the crystalline melting temperature of a semi-crystalline composition.

Polyethylene polymer(s) and like terminology refers to a polymer, including ethylene derived repeat units. Typically, ethylene polymers are more than 80 wt % ethylene and are semi-crystalline.

Polypropylene polymer(s) and like terminology refers to polymers comprising polypropylene repeat units. Most polypropylene polymers are more than 80 wt. % polypropylene except that polypropylene copolymers with ethylene may comprise less propylene than that. Polypropylene polymers are semi-crystalline.

A "semi-crystalline polyolefin composition" includes one or more polyolefin polymers, typically a polyethylene polymer or a polypropylene polymer. The composition exhibits a crystalline melting temperature.

"Predominantly", "primarily" and like terminology when referring to a component in a composition means the component is present in an amount of more than 50% by weight of the composition.

Amorphous Cycloolefin Containing Polymers and Polymer Compositions

Cycloolefins are mono- or polyunsaturated polycyclic ring systems, such as cycloalkenes, bicycloalkenes, tricycloalkenes or tetracycloalkenes. The ring systems can be monosubstituted or polysubstituted. Preference is given to cycloolefins of the formulae I, II, III, IV, V or VI, or a monocyclic olefin of the formula VII:

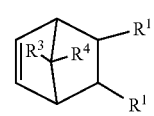

(I)

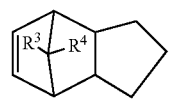

(II)

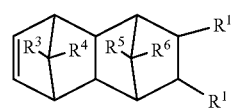

(III)

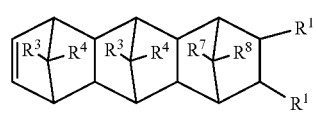

(IV)

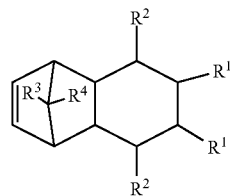

(V)

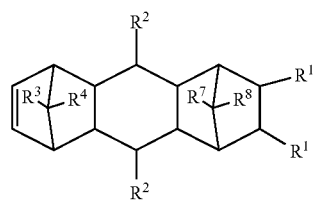

(VI)

(VII)

wherein $R^1$, $R^2$, $R^3$, $R^4$, $R^5$, $R^6$, $R^7$ and $R^8$ are the same or different and are H, a $C_6$-$C_{20}$-aryl or $C_1$-$C_{20}$-alkyl radical or a halogen atom, and n is a number from 2 to 10.

Specific cycloolefin monomers are disclosed in U.S. Pat. No. 5,494,969 to Abe et al. Cols. 9-27, for example the following monomers:

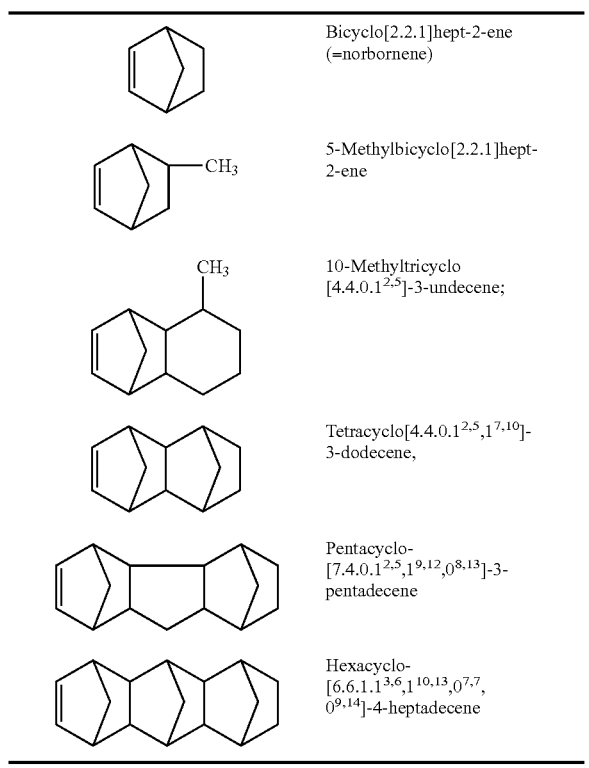

Bicyclo[2.2.1]hept-2-ene (=norbornene)

5-Methylbicyclo[2.2.1]hept-2-ene

10-Methyltricyclo [4.4.0.1$^{2,5}$]-3-undecene;

Tetracyclo[4.4.0.1$^{2,5}$,1$^{7,10}$]-3-dodecene,

Pentacyclo-[7.4.0.1$^{2,5}$,1$^{9,12}$,0$^{8,13}$]-3-pentadecene

Hexacyclo-[6.6.1.1$^{3,6}$,1$^{10,13}$,0$^{7,7}$, 0$^{9,14}$]-4-heptadecene and so forth. The disclosure of U.S. Pat. No. 5,494,969 to Abe et al., Cols. 9-27, is incorporated herein by reference.

U.S. Pat. Nos. 6,068,936 and 5,912,070 disclose several cycloolefin polymers and copolymers, the disclosures of which are incorporated herein in their entirety by reference. Cycloolefin polymers useful in connection with the present invention can be prepared with the aid of transition-metal catalysts, e.g. metallocenes. Suitable preparation processes are known and described, for example, in DD-A-109 225, EP-A-0 407 870, EP-A-0 485 893, U.S. Pat. Nos. 6,489,016, 6,008,298, as well as the aforementioned U.S. Pat. Nos. 6,068,936, and 5,912,070, the disclosures of which are all incorporated herein in their entirety by reference. Molecular weight regulation during the preparation can advantageously be effected using hydrogen. Suitable molecular weights can also be established through targeted selection of the catalyst and reaction conditions. Details in this respect are given in the abovementioned specifications.

Particularly preferred cycloolefin copolymers include cycloolefin monomers and acyclic olefin monomers, i.e. the above-described cycloolefin monomers can be copolymerized with suitable acyclic olefin comonomers. A preferred comonomer is selected from the group consisting of ethylene, propylene, butylene and combinations thereof. A particularly preferred comonomer is ethylene. Preferred COCs contains about 10-80 mole percent of the cycloolefin monomer moiety and about 90-20 weight percent of the olefin moiety (such as ethylene). Cycloolefin copolymers which are suitable for the purposes of the present invention typically have a mean molecular weight $M_w$ in the range from more than 200 g/mol to 400,000 g/mol. COCs can be characterized by their glass transition temperature, Tg, which is generally in the range from 20° C. to 200° C., preferably in the range from 60° C. to 145° C. when used in connection with the present invention. In one preferred embodiment the cyclic olefin polymer is a copolymer such as TOPAS® COC-110, described below.

Properties for several COC grades are summarized in Table 1.

TABLE 1

| | COC Properties | | | | |
|---|---|---|---|---|---|
| Property | COC-65 | COC-78 | COC-110 | COC-138 | E-140 |
| Density (kg/m$^3$) ISO 1183 | 1010 | 1010 | 1010 | 1020 | 940 |
| Melt Flow Rate (dg/min); 230° C., 2.16 kg load 190° C., 2.16 kg load ISO 1133 (calculated w/ melt density 0.92) | 5.5 0.9 | 11.0 1.9 | 9.2 1.7 | 0.9 <0.1 | 2.7 0.9 |
| Glass Transition Temperature (° C.) (10° C./min) ISO 11357-1 ,-2, -3 | 65 | 78 | 110 | 138 | 6 |
| Tensile Modulus (MPa) ISO 527-1, -2 | 2300 | 2400 | 2700 | 2900 | 50 |
| Water Adsorption (%) (23° C.-sat) ISO 62 | 0.01 | 0.01 | 0.01 | 0.01 | |
| Water Vapor Permeability (g-100 μm/m$^2$ day) {38° C. 50% RH} ISO 15106-3 | 0.8 | 0.8 | 1.0 | 1.3 | 4.6 |
| Haze (%) ISO 14782 {50 μm cast film} | <2 | <2 | <4 | <1 | <1 |
| Gloss at 60° ISO 2813 {50 μm cast film} | >120 | >120 | >120 | >120 | >120 |

The various grades of COC may be melt-blended to promote compatibility with the HDPE employed in terms of melt viscosities and temperatures.

The blends used in connection with the invention may be prepared by any suitable method, including solution blending, melt compounding by coextrusion prior to injection molding and/or "salt and pepper" pellet blending to an injection molding apparatus and the like. Typical twin-screw extrusion, melt spinning and compounding conditions for representative compositions are set forth in Tables 10 and 12.

COC grade selection of COC is a critical choice. The glass transition temperature of COC-110 is nominally 110° C. As with many amorphous thermoplastics, as temperature increases toward Tg, tensile strength decreases, but strain significantly increases to over 60 percent. Details of tensile properties of COC-110 appear graphically in FIG. 2 and in Table 2, below.

TABLE 2

Tensile Properties

Tensile properties of TOPAS ® COC-110

|  | 23° C. | | 40° C. | | 60° C. | | 80° C. | | 100° C. | |
| --- | --- | --- | --- | --- | --- | --- | --- | --- | --- | --- |
|  | Strength (MPa) | Strain (%) | Strength (MPa) | Strain (%) | Strength (MPa) | Strain (%) | Strength (MPa) | Strain (%) | Strength (MPa) | Strain (%) |
| 1 | 52 | 9.4 | 47 | 15.5 | 40 | 46.9 | 33 | >60 | 21 | >60 |
| 2 | 52 | 9.7 | 47 | 16.4 | 40 | 40.1 | 32 | >60 | 22 | >60 |
| 3 | 52 | 9.5 | 47 | 15.3 | 40 | 44.8 | 32 | >60 | 23 | >60 |
| Average | 52 | 9.5 | 47 | 15.7 | 40 | 43.9 | 32 | >60 | 22 | >60 |

Tensile measurements:
Machine: SHIMADZU AutoGraph AG20KNXD
Test speed: 50 mm/min
Span: 115 mm
Maximum strain: 60%
Measured temperature: 23, 40, 60, 80 and 100° C.
Specimen preparation:
Test piece: ISO Tensile bar 4mmt
Machine: NISSEI NEX-500
Cylinder temperature 250-250-250-240-230° C.
Mold temperature: 65° C.
Injection speed: 70 mm/s Above Tg, COC-110 transitions thermally into a ductile rubbery solid. 10 to 20 percent, preferably 13 to 17 percent COC blended or compounded into HDPE provides HDPE a thermally stable dispersed polymer network, which provides stability to HDPE as it approaches its crystalline melting point during reheat stretch blow-molding as is appreciated from FIG. 3.

Cycloolefin Copolymer Elastomers

COC elastomers such as E-140 are elastomeric cyclic olefin copolymers also available from TOPAS Advanced Polymers. E-140 polymer features two glass transition temperatures, one of about 6° C. and another glass transition below −90° C. as well as a crystalline melting point of about 84° C. Unlike completely amorphous TOPAS COC grades, COC elastomers typically contain between 10 and 30 percent crystallinity by weight. Typical properties of E-140 grade appears in Table 3:

TABLE 3

E-140 Elastomer Properties

| Property | Value | Unit | Test Standard |
| --- | --- | --- | --- |
| Physical Properties | | | |
| Density | 940 | kg/m³ | ISO 1183 |
| Melt volume rate (MVR) - @ 2.16 kg/190° C. | 3 | cm³/10 min | ISO 1133 |
| Melt volume rate (MVR) - @ 2.16 kg/260° C. | 12 | cm³/10 min | ISO 1133 |
| Hardness, Shore A | 89 | — | ISO 868 |
| WVTR - @ 23° C./85RH | 1.0 g * 100 μm/ m² * day | | ISO 15106-3 |
| WVTR - @ 38° C./90 RH | 4.6 g * 100 μm/ m² * day | | ISO 15106-3 |
| Mechanical Properties | | | |
| Tensile stress at break (50 mm/min) | >19 | MPa | ISO 527-T2/1A |
| Tensile modulus (1 mm/min) | 44 | MPa | ISO 527-T2/1A |
| Tensile strain at break (50 mm/min) | >450 | % | ISO 527-T2/1A |

TABLE 3-continued

E-140 Elastomer Properties

| Property | Value | Unit | Test Standard |
| --- | --- | --- | --- |
| Tear Strength | 47 | kN/m | ISO 34-1 |
| Compression set - @ 24 h/23° C. | 35 | % | ISO 815 |
| Compression set - @ 72 h/23° C. | 32 | % | ISO 815 |
| Compression set - @ 24 h/60° C. | 90 | % | ISO 815 |
| Thermal Properties | | | |
| Tg - Glass transition temperature (10° C./min) | 6 <-90 | ° C. | DSC |
| $T_m$ - Melt temperature | 84 | ° C. | DSC |
| Vicat softening temperature, VST/A50 | 64 | ° C. | ISO 306 |

As seen above, E-140 has multiple glass transitions (Tg); one occurs at less than −90° C. and the other occurs in the range from −10° C. to 15° C. Details on COC elastomers appear in U.S. Pat. No. 9,452,593.

Generally, suitable partially crystalline elastomers of norbornene and ethylene include from 0.1 mol % to 20 mol % norbornene, have a glass transition temperature of less than 30° C., a crystalline melting temperature of less than 125° C. and 40% or less crystallinity by weight. Particularly preferred elastomers exhibit a crystalline melting temperature of less than 90° C. and more than 60° C. Cycloolefin elastomers useful in connection with the present invention may be produced in accordance with the following: U.S. Pat. Nos. 5,693,728 and 5,648,443 to Okamoto et al.; European Patent Nos. 0 504 418 and 0 818 472 (Idemitsu Kosan Co., Ltd. and Japanese Patent No. 3350951, also of Idemitsu Kusan Co., Ltd., the disclosures of which are incorporated herein by reference.

Other norbornene/α-olefin copolymer elastomers are described in U.S. Pat. No. 5,837,787 to Harrington et al., the disclosure of which is incorporated herein by reference.

Cyclic Block Copolymer

Cyclic block copolymer (CBC) is prepared by substantially fully hydrogenating a vinyl aromatic/conjugated diene block copolymer such as a styrene-butadiene block copolymer:

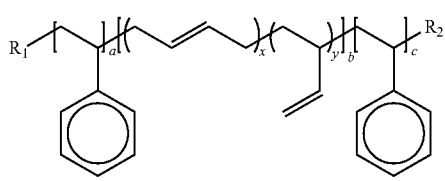

Styrene-Butadiene-Styrene

H₂ | catalyst

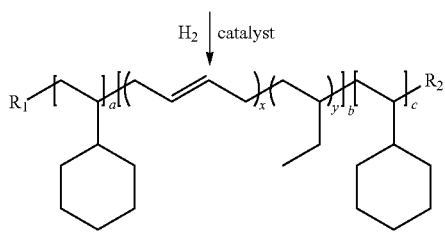

PCHE-EB-PCHE

These polymers may be tailored by adjusting the ratio of poly(cyclohexylethylene)(PCHE) and ethylene-co-1-butene (EB) to provide a range of properties. See U.S. Pat. No. 9,103,966.

Prior to hydrogenation, the vinyl aromatic/conjugated diene block copolymer may have any known architecture, including distinct block, tapered block, and radial block. Distinct block structures that include alternating vinyl aromatic blocks and conjugated diene blocks yield preferred results, especially when such block structures yield triblock copolymers or pentablock copolymers, in each case with vinyl aromatic end blocks. Typical vinyl aromatic monomers include styrene, alpha-methylstyrene, all isomers of vinyl toluene (especially para-vinyl toluene), all isomers of ethyl styrene, propyl styrene, butyl styrene, vinyl biphenyl, vinyl naphthalene, vinyl anthracene and the like, or mixtures thereof. The block copolymers can contain one or more than one polymerized vinyl aromatic monomer in each vinyl aromatic block. The vinyl aromatic blocks preferably comprise styrene, more preferably consist essentially of styrene, and still more preferably consist of styrene.

The conjugated diene blocks may comprise any monomer that has two conjugated double bonds. Illustrative, but non-limiting, examples of conjugated diene monomers include butadiene, 2-methyl-1,3-butadiene, 2-methyl-1,3-pentadiene, isoprene, or mixtures thereof. As with the vinyl aromatic blocks, the block copolymers may contain one (for example, butadiene or isoprene) or more than one (for example, both butadiene and isoprene). Preferred conjugated diene polymer blocks in the block copolymers may, prior to hydrogenation, comprise polybutadiene blocks, polyisoprene blocks or mixed polybutadiene/polyisoprene blocks. While a block copolymer may, prior to hydrogenation, include one polybutadiene block and one polyisoprene block, preferred results follow with block copolymers that, prior to hydrogenation, have conjugated diene blocks that are solely polybutadiene blocks or solely polyisoprene blocks. A preference for a single diene monomer stems primarily from manufacturing simplicity. In both cases, the microstructure of diene incorporation into the polymer backbone can be controlled to achieve a CBC polymer that is substantially or fully amorphous.

Illustrative preferred vinyl aromatic/conjugated diene block copolymers wherein each vinyl aromatic block comprises styrene (S) and each conjugated diene block comprises butadiene (B) or isoprene (I) include SBS and SIS triblock copolymers and SBSBS and SISIS pentablock copolymers. While the block copolymer may be a triblock copolymer or, more preferably a pentablock copolymer, the block copolymer may be a multiblock that has one or more additional vinyl aromatic polymer blocks, one or more additional conjugated diene polymer blocks or both one or more additional vinyl aromatic polymer blocks and one or more additional conjugated diene polymer blocks, or a star block copolymer (for example, that produced via coupling). One may use a blend of two block copolymers (for example, two triblock copolymers, two pentablock copolymers or one triblock copolymer and one pentablock copolymer) if desired. One may also use two different diene monomers within a single block, which would provide a structure that may be shown as, for example, SIBS. These representative structures illustrate, but do not limit, block copolymers that may be suitable for use as the first polymer in an embodiment of this invention.

"Substantially fully hydrogenated" means that at least 95 percent of the double bonds present in vinyl aromatic blocks prior to hydrogenation are hydrogenated or saturated and at least 97 percent of double bonds present in diene blocks prior to hydrogenation are hydrogenated or saturated. By varying the relative length of the blocks, total molecular weight, block architecture (e.g., diblock, triblock, pentablock, multi-armed radial block, etc.) and process conditions, various types of nanostructure morphology can be obtained from this block copolymer and thereby modify the optical properties of the major phase. Specific, non-limiting examples include lamellar morphology, bi-continuous gyroid morphology, cylinder morphology, and spherical morphology, etc. The morphology and microphase separation behavior of a block copolymer is well known and may be found, for example, in The Physics of Block Copolymers by Ian Hamley, Oxford University Press, 1998. Particularly preferred CBC polymers are those having an amount of styrene from 65 wt % to less than 90 wt % and an amount of conjugated diene from more than 10 wt % to 35 wt %, prior to hydrogenation.

Number average molecular weight (Mn) and weight average molecular weight (Mw) can both be used to describe the CBC. Because these polymers tend to have very narrow molecular weight polydispersities, the difference between Mn and Mw is minimal. The ratio of Mw to Mn is typically 1.1 or less. In fact, in some cases the number average molecular weight and the number average molecular weight will be virtually the same.

Methods of making block copolymers are well known in the art. Typically, block copolymers are made by anionic polymerization, examples of which are cited in Anionic Polymerization: Principles and Practical Applications, H. L. Hsieh and R. P. Quirk, Marcel Dekker, New York, 1996. In one embodiment, block copolymers are made by sequential monomer addition to a carbanionic initiator such as sec-butyl lithium or n-butyl lithium. In another embodiment, the copolymer is made by coupling a triblock material with a divalent coupling agent such as 1,2-dibromoethane, dichlorodimethylsilane, or phenylbenzoate. In this embodiment, a small chain (less than 10 monomer repeat units) of a conjugated diene polymer can be reacted with the vinyl aromatic polymer coupling end to facilitate the coupling reaction. Vinyl aromatic polymer blocks are typically difficult to couple, therefore, this technique is commonly used to achieve coupling of the vinyl aromatic polymer ends. The small chain of diene polymer does not constitute a distinct block since no microphase separation is achieved. Coupling reagents and strategies which have been demonstrated for a variety of anionic polymerizations are discussed in Hsieh and Quirk, Chapter 12, pp. 307-331. In another embodiment, a difunctional anionic initiator is used to initiate the polymerization from the center of the block system, wherein subsequent monomer additions add equally to both ends of the growing polymer chain. An example of such a difunctional initiator is 1,3-bis(1-phenylethenyl)benzene treated with organo-lithium compounds, as described in U.S. Pat. Nos. 4,200,718 and 4,196,154.

After preparation of the block copolymer, the copolymer is hydrogenated to remove sites of unsaturation in both the conjugated diene polymer block and the vinyl aromatic polymer block segments of the copolymer. Any method of hydrogenation can be used and such methods typically include the use of metal catalysts supported on an inorganic substrate, such as Pd on $BaSO_4$ (U.S. Pat. No. 5,352,744) and Ni on kieselguhr (U.S. Pat. No. 3,333,024). Additionally, soluble, homogeneous catalysts such those prepared from combinations of transition metal salts of 2-ethylhexanoic acid and alkyl lithiums can be used to fully saturate block copolymers, as described in Die Makromolekulare Chemie, Volume 160, pp. 291, 1972. The copolymer hydrogenation can also be achieved using hydrogen and a heterogeneous catalyst such as those described in U.S. Pat. Nos. 5,352,744, 5,612,422 and 5,645,253.

"Level of hydrogenation" and like terms means the percentage of the original unsaturated bonds which become saturated upon hydrogenation. The level of hydrogenation in hydrogenated vinyl aromatic polymers is determined using UV-VIS spectrophotometry, while the level of hydrogenation in hydrogenated diene polymers is determined using proton NMR.

In one embodiment the composition comprises a hydrogenated block copolymer of a vinyl aromatic and a conjugated diene in which the block copolymer is a penta-block copolymer comprising three blocks of hydrogenated vinyl aromatic polymer and two blocks of conjugated diene polymer. The hydrogenated penta-block copolymer comprises less than 90 weight percent hydrogenated vinyl aromatic polymer blocks, based on the total weight of the hydrogenated block copolymer, and has an aromatic and diene hydrogenation level of at least 95 percent.

CBC's are available from USI under the product designation Puratran™. Some typical polymers have the properties enumerated below in Table 4.

TABLE 4

CBC Properties

| Properties | Unit | Test Method (ASTM) | Puratran™ HP010 | Puratran™ HP030 | Puratran™ UHT081 |
|---|---|---|---|---|---|
| General Properties | | | | | |
| Density | g/cm³ | D792 | 0.94 | 0.94 | 0.93 |
| Water uptake | % | D670 | <0.01 | <0.01 | <0.01 |
| Melt flow rate (1.2 kg. 260° C.) | g/10 min | D1238 | 54.6 | 5.5 | 0.04 |
| Melt flow rate (1.2 kg. 280° C.) | g/10 min | D1238 | 136.3 | 21.0 | 0.15 |
| Melt flow rate (1.2 kg. 300° C.) | g/10 min | D1238 | 296.0 | 62.5 | 1.40 |
| Thermal Properties | | | | | |
| Tg (TMA) | ° C. | USI method | 117 | 129 | 133 |
| DTUL (455 kPa) | ° C. | D648 | 102 | 115 | 128 |
| Vicat softening point (1 kg) | ° C. | D1525 | 117 | 128 | 134 |
| Mecanical Properties | | | | | |
| Flexural strength | MPa | D790 | 71.7 | 74.2 | 59.3 |
| Flexural modulus | GPa | D790 | 2.5 | 2.6 | 2.2 |
| Y.P. Tensile strength | MPa | D638 | 33.7 | 33.5 | 27.6 |
| B.P. Tensile strength | MPa | D638 | 32.9 | 33.6 | 26.1 |
| Tensile modulus | GPa | D638 | 2.6 | 2.6 | 2.2 |
| Elongation | % | D638 | 3.7 | 7.6 | 6.0 |
| Izod Impact strength | J/m | D256 | 29.5 | 34.1 | 36.0 |

Polyolefins

Polyolefins are high molecular weight hydrocarbons. They include: low-density; linear low-density and high-density polyethylene; polypropylene; polypropylene copolymer as well as other polymers. See *Kirk-Othmer Encyclopedia of Chemical Technology*, 3$^{rd}$ ed., Vol. 16, pp. 385-499, Wiley 1981. All are break-resistant, nontoxic, and non-contaminating. "Partially crystalline" polyolefins, and like terminology refers to a partially crystalline material which contains polyolefin repeat units and exhibits a (crystalline) melting point. A partially crystalline composition contains or consists essentially of a partially crystalline polymer.

"Polypropylene" includes thermoplastic resins made by polymerizing propylene with suitable catalysts, generally aluminum alkyl and titanium tetrachloride mixed with solvents. This definition includes all the possible geometric arrangements of the monomer unit, such as: with all methyl groups aligned on the same side of the chain (isotactic), with the methyl groups alternating (syndiotactic), all other forms where the methyl positioning is random (atactic), and mixtures thereof. Polypropylene copolymer (PPCO) is essentially a linear copolymer with ethylene and propylene repeat units. It combines some of the advantages of both polymers. PPCO is typically more than 80 wt % polypropylene units, but may be made with less propylene and more ethylene in some cases. Polypropylenes do exhibit some strain hardening behavior, but ISBM performance may be greatly enhanced with the addition of alicyclic polyolefins.

Figure 8:
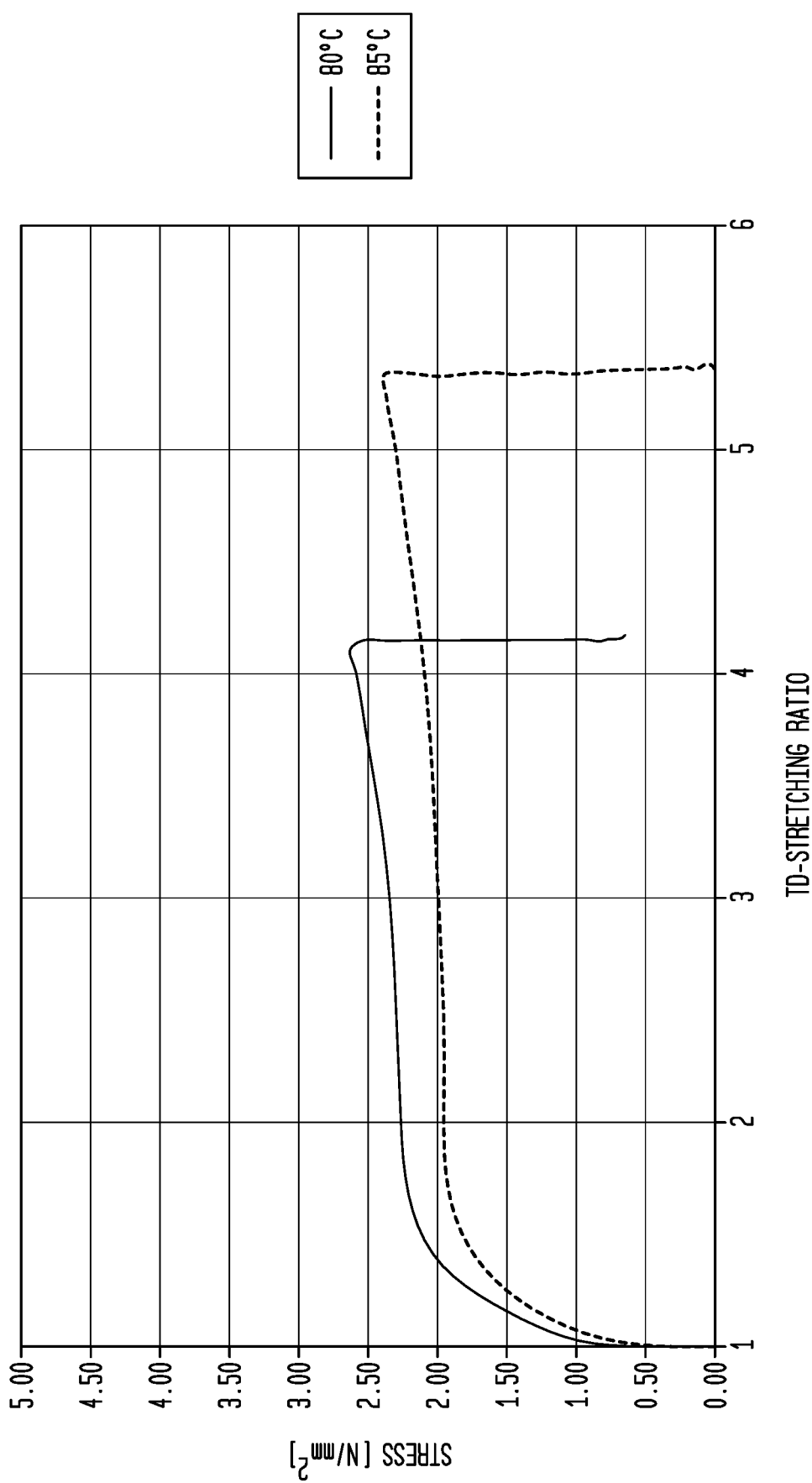
FIG. 8 is a plot of Stress vs TD Stretch for a multilayer structure of COC-68/PE/COC-68 at two stretching temperatures.
Figure 9:
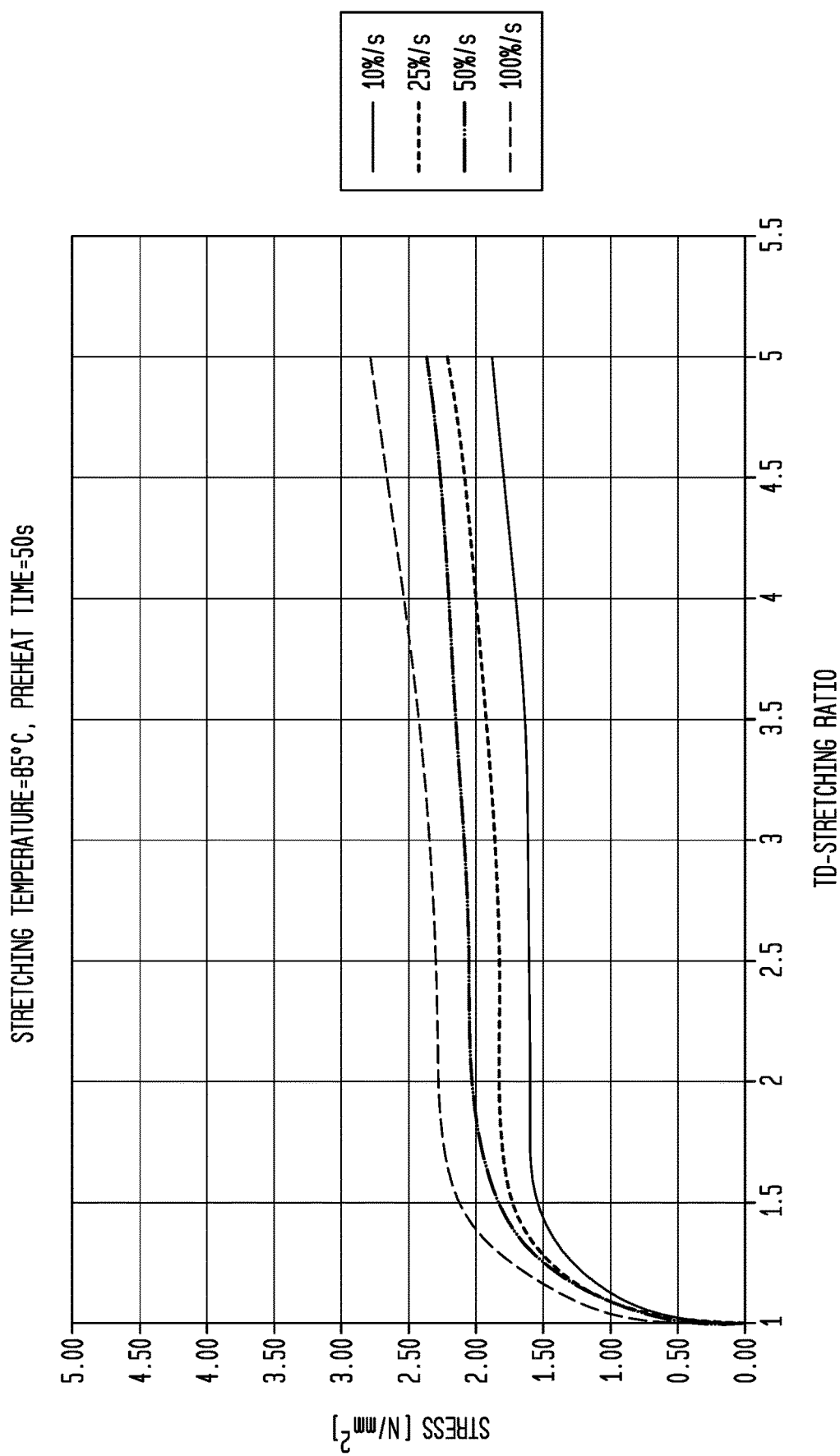
FIG. 9: is a plot of Stress vs TD Stretch for a multilayer structure of COC-68/PE/COC-68 at multiple stretching speeds.

Polyethylenes are particularly useful because of their processability, mechanical and optical properties, as well as compatability with the polymer blends of the present invention. Polyethylenes which are useful include commercially available polymers and copolymers such as low density polyethylene, linear low density polyethylene (LLDPE), intermediate density polyethylene (MDPE) and high density polyethylene (HDPE). Semi-crystalline polyethylenes, including HDPE exhibit little, if any, strain hardening behavior, but that property is greatly enhanced with the addition of alicyclic polyolefins as is seen in FIGS. 8-10.

Figure 4:
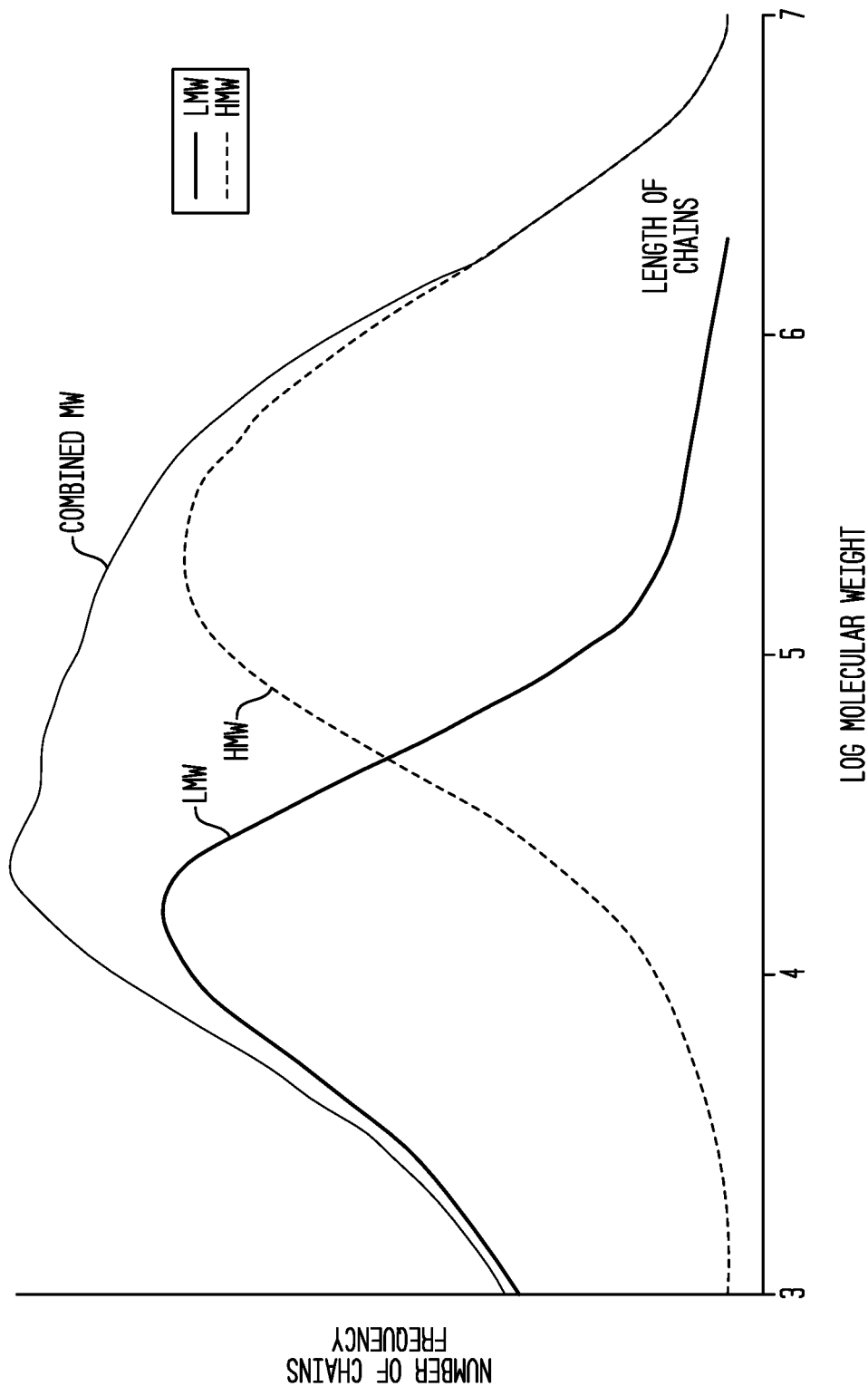
FIG. 4 is a plot of chain frequency versus molecular weight for bimodal HDPE.
Figure 5:
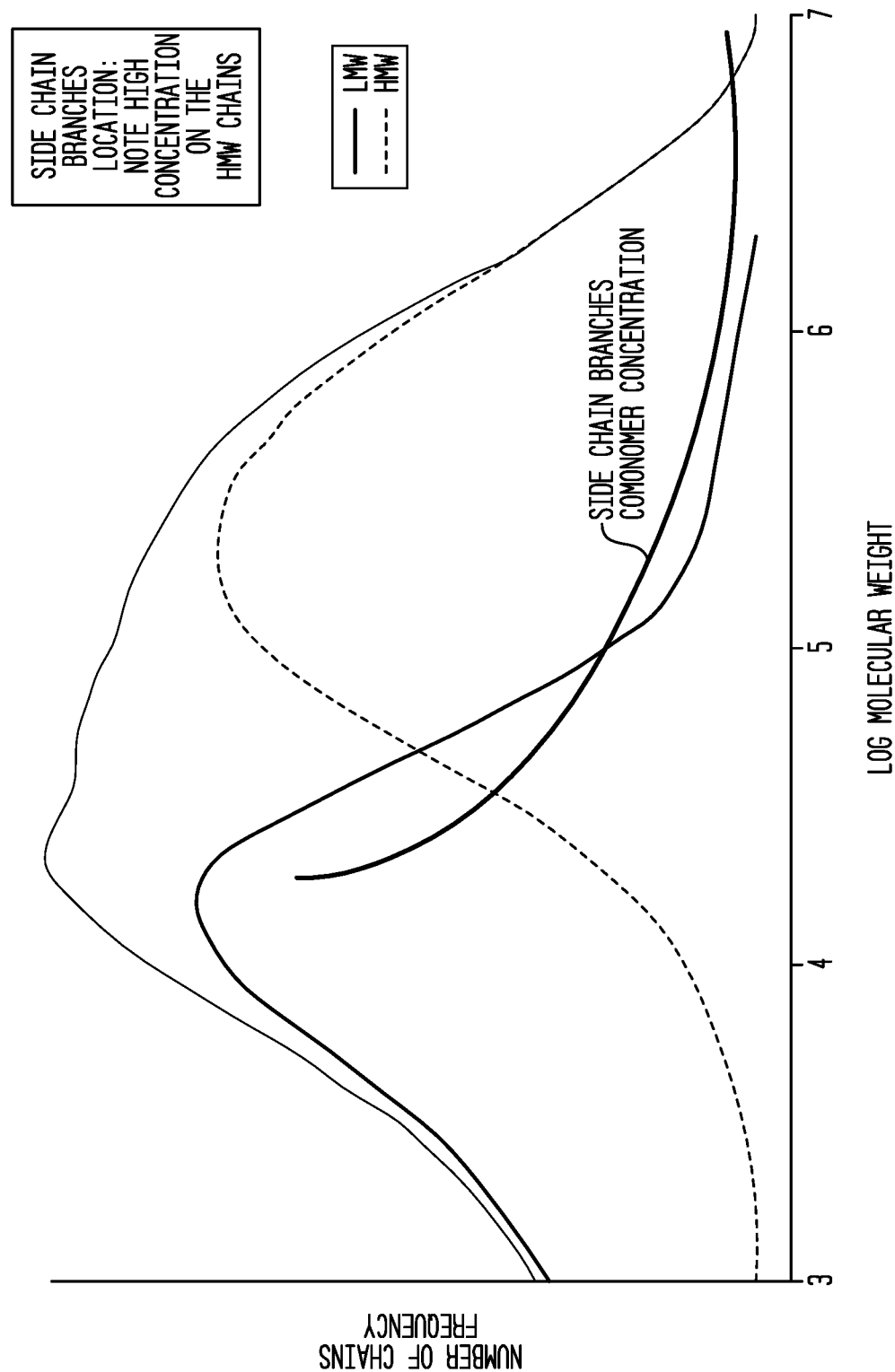
FIG. 5 is a plot of chain frequency, side chain branch frequency and comonomer incorporation versus molecular weight for bimodal HDPE.

HDPE is polyethylene having a density in the range of 0.93 g/cc to 0.98 g/cc, typically greater or equal to 0.941 g/cc. HDPE has a low degree of branching and thus stronger intermolecular forces and tensile strength. HDPE can be produced, for example, by chromium/silica catalysts, Ziegler-Natta catalysts or single site catalysts. The lack of branching is ensured by an appropriate choice of catalyst (e.g. Chromium catalysts or Ziegler-Natta catalysts) and reaction conditions. In some embodiments, it is preferred to use bimodal HDPE as is disclosed in United States Patent Application Publication No. US 2012/0282422, entitled "Bimodal Polyethylene for Injection Stretch Blow Moulding Applications", of Boissiere et al. and U.S. Pat. No. 8,609,792 of Vantomme et al. entitled "Bimodal Polyethylene for Blow Moulding Applications", as well as United States Patent Application Publication Nos.: US 2012/0245307; US 2012/0252988; the disclosures of which are incorporated herein by reference. In general, the molecular weight of the HDPE and other partially crystalline polyolefins employed is anywhere from 28,000 to 280,000 Daltons. Typical properties for unimodal and bimodal HDPE appear in Table 5. Molecular weight data for bimodal HDPE appears in FIG. 4. FIG. 5 presents comonomer incorporation data and side-chain data for a bimodal HDPE.

TABLE 5

Comparison of Bimodal and Unimodal HDPE

|  | Bimodal Copolymer | Unimodal Copolymer Purpose Blow-Molding | Unimodal Homopolymer Blow-Molding |
|---|---|---|---|
| Melt Index (g/10 min.)- ASTM D1238 | 0.45 | 0.3 | 0.7 |
| Density (g/cc)-ASTM D792 | 0.957 | 0.955 | 0.962 |
| ESCR @ 10% (hrs)- ASTM D1693, Cond. B | 300 | 60 | 15 |
| Flex. Modulus (psi)- ASTM D790 | 170 | 150 | 225 |

HDPE properties are density dependent. Table 6 summarizes melting point and heat distortion temperature of HDPE at two densities. During the reheat stretch blow-molding process, HDPE blow-molding temperatures of 117-120° C. is significantly above its HDT. Minor variations in temperature along the preform and throughout the wall change how crystalline HDPE responds to the stress during reheat blow-molding. Addition of an amorphous ductile and rubbery, but mechanically stable phase provided by COC helps keep HDPE mechanically stable during reheat blow-molding process.

TABLE 6

HDPE Thermal Properties versus Density

| $T_m$ (° C.) | Heat Distortion Temp. (° C.) | Density (g/cc) |
|---|---|---|
| 130 | 79 | 0.952 |
| 137 | 91 | 0.965 |

The properties of some commercially available for use in connection with the present invention are listed in Tables 7 and 8:

TABLE 7

High Density Polyethylene B5845 (Total) Properties. Excellent stress cracking resistance, high stiffness

|  | Method | Unit | Typical Value |
|---|---|---|---|
| Rheological Properties[1] |  |  |  |
| Melt Flow Index 190° C./2.16 kg | D-1238 | g/10 min | 0.45 |
| Mechanical Properties[1][2] |  |  |  |
| Tensile Strength @ Yield | D-638, Type IV specimen, 2 in/min | psi | 4500 |
| Elongation at Break | D-638, Type IV specimen, 2 in/min | % | 200 |
| Flexural Modulus @ 2% strain | D-790 | psi | 135,000 |
| Flexural Modulus @ 1% strain | D-790 | psi | 165,000 |
| ESCR[3] 100% lgepal 10% lgepal | D1693, B | hrs | >800 >300 |
| Thermal Properties[1][2] |  |  |  |
| Blow-Molding Stock Temperature |  | ° F. | 360- |
| Extrusion Melt Temperature |  | ° F. | 380- |
| Other Physical Properties |  |  |  |
| Density | D-792 | g/cm³ | 0.958 |

[1]Data developed under laboratory conditions and are not to be used as specification, maxima or minima.
[2]The data listed were determined on compression-molded specimens and may, therefore, vary from specimens taken from molded articles.
[3]Environmental Stress Crack Resistance (ESCR)

TABLE 8

Polyethylene HDPE SB 1359 (Total) Properties

|  | Nominal Value | Unit | Test Method |
|---|---|---|---|
| Physical |  |  |  |
| Density | 0.959 | g/cm³ | ISO 1183 |
| Environmental Stress-Cracking Resistance 100% Antarox, F50 | <100 | hr | ASTM D1693B |
| Mechanical |  |  |  |
| Flexural Modulus Injection | 1300 | MPa | ISO 178 |
| Processing (Melt) Temp | 220 to 240° C. |  |  |

Using HDPE 1359, different types of preforms with different shapes can be produced. Typically, polyethylene resin is injected into the injection mold at an injection temperature of at least 220° C. and at most 260° C. If the temperature is too low, the pressure could be too high and exceed the maximum pressure accepted by the plasticating unit. If the temperature is too high, degradation of polyethylene could occur. Smooth preform surface is a requirement to achieve a good thickness bottle distribution with a good surface aspect. In fact, the blowing process cannot attenuate any defects already present in the preform surface. Globally moderate conditions (injection speed, for example) ensure to minimize stress in the preform which allows the production of optimized bottles (optics, thickness repartition and mechanical properties). So generally, the flow rate should be of, at most, about 15 cm³/s. Polyethylenes, including HDPE, exhibit little, if any, strain hardening like PET; it is therefore recommended to minimize the concentricity of the preform to achieve optimized bottle.

For optimal stretching and blowing, the preform temperature should be around 120° C. (skin temperature measured before blow-mold closing). This temperature has to be adapted taking into account the design of the bottle, especially. If the temperature is too low, then the bottle/preform could be hard to stretch and to blow; if the temperature is too high, then the polyethylene could melt in the machine.

The stretch rod speed can go up to 2000 mm/s. Preferably, it should be in the range from 500 mm/s to 1500 mm/s.

Pre-blow pressure is of about a few bars (preferably up to 10 bars). The preform is blown into its final shape using gas with a pressure up to 40 bars, generally. A blowing pressure of about 15 bars is recommended. Higher pressure may be needed to ensure sharp details engravings. As polyethylene exhibits little, if any, strain hardening, it is recommended to use a gentle airflow during blowing stages for this material.

LDPE typically has a density in the range of 0.910-0.940 g/cc. LDPE may be, for example, prepared at high pressure with free-radical initiation, giving highly branched PE having internally branched side chains of varying length. Therefore, it has less strong intermolecular forces as the instantaneous-dipole induced-dipole attraction is less. This results in a lower tensile strength and increased ductility. LLDPE is a substantially linear polyethylene, with significant numbers of short branches, commonly made by copolymerization of ethylene with short-chain α-olefins (e.g. copolymerization with 1-butene, 1-hexene, or 1-octene yield b-LLDPE, h-LLDPE, and o-LLDPE, respectively) via metal complex catalysts. LLDPE is typically manufactured in the density range of 0.915-0.925 g/cc. However, as a function of the α-olefin used and its content in the LLDPE, the density of LLDPE can be adjusted between that of HDPE and very low densities of 0.865 g/cc. Polyethylenes with very low densities are also termed VLDPE (very low density) or ULDPE (ultra low density). LLDPE has higher tensile strength than LDPE and exhibits higher impact and puncture resistance than LDPE. Lower thickness (gauge) films can be blown compared to LDPE, with better environmental stress cracking resistance compared to LDPE. Lower thickness (gauge) may be used compared to LDPE. Metallocene metal complex catalysts can be used to prepare LLDPEs with particular properties, e.g. high toughness and puncture resistance. Polyethylenes which are prepared with metallocene catalysts are termed "m-LLDPEs". The variability of the density range of m-LLDPEs is similar to that of the density range of LLDPE, and grades with extremely low densities are also termed plastomers. MDPE is polyethylene having a density range of 0.926-0.940 g/cc. MDPE may be produced with any suitable catalysts, such as chromium/silica catalysts, Ziegler-Natta catalysts or metallocene catalysts. MDPE has good shock and drop resistance properties. It also is less notch sensitive than HDPE, stress cracking resistance is better than HDPE.

Twin screw compounding can tailor cyclic olefin copolymers to satisfy a variety of property requirements. See U.S. Pat. No. 9,452,593 for comprehensive disclosures. Heat resistance, as measured by glass transition temperature or heat distortion temperature, is one of the important functional properties, enabling COC to function properly as a modifier for reheat ISBM HDPE bottle manufacturing. Examples of blends are shown in Table 9. COC and blends of at least two COC grades, differing by glass transition temperature, is compounded with Kraton RP6935, a styrene block copolymer with styrene content of about 55 percent, and COC-E, an elastomeric cyclic olefin copolymer. COC-136 is COC with target glass transition temperature of 136° C. (277° F.) and melt volume flow rate of 12.45 cc/10 min. COC-128 is COC with target glass transition temperature of 128° C. (262° F.) and melt volume flow rate of 11.0 cc/10 min. Melt volume flow rate was measured at 2.16 kg, 260° C. per ISO 1133. 20 weight percent Kraton RP6935 efficiently impact modifies COC-136 (C09-10-1) and COC-128 (C09-10-2), preserving heat resistance as measured by heat distortion temperature–262° F. and 248° C. respectively. Flexural properties are similar for both compounds. In addition to good high speed puncture, COC-136 (C09-10-1) is little more notch sensitive than TOPAS COC-128 (C09-10-2), 2.92 versus 6.06 ft-lb/inch notched Izod impact strength respectively. Blending either TOPAS COC-136 or TOPAS COC-78 with a lower glass transition grade, such as TOPAS COC-78 and TOPAS COC-65 creates COC compound with blended glass transition temperatures due to molecular miscibility of these polymers. Heat resistance of the compound, such as heat distortion temperature, can be tailored based on the rule of mixtures of the glass transition temperature or heat distortion temperature of the individual components. COC-E efficiently impact modifies these COC blends and preserves stiffness as show by flexural modulus and flexural strength.

In addition to polymers and impact modifiers, most compounds contain various additives, such as colorants and stabilizers, to improve functionality. In Table 10, twin screw compounding conditions for COC compounds are shown. Compounding was done on lab-scale Coperion ZSK 26 twin screw extruder. TOPAS COC-138 and TOPAS COC-128 are impact modified with Kraton RP6935. Small percentage of COC-E performs similar to a compatibilizer, helping to bridge the interfaces between the styrene block copolymer rubbery phase and COC matrix phase. Additives include decolorizer OCS51665431, Licowax C, Hostanox 0101 and Irgafos 168. OCS51665431 is a blue tint color concentrate consisting of ultramarine blue and TOPAS COC manufactured by Clariant Corporation. Licrowax C is bisstearoylethyenediamine powder lubricant. Hostanox 0101, similar to Irganox 1010, is a primary antioxidant. Irgafos 168 is phenol, 2,4-bis(1,1-dimethylethyl), phosphite antioxidant and heat stabilizer.

Properties of COC compounds with additives are shown in Table 11. Impact resistance and optical properties, including haze, transmittance, and gloss, were similar among the three compositions. In this example, these additives did not have negative influence on mechanical and optical properties. Difference in heat distortion temperature is accounted for by the difference in glass transition temperature between TOPAS COC-138 and TOPAS COC-128. COC-138 has a heat deflection temperature (HDT, ASTM D648-07, method B) of 130° C.

| Property | Compound ID<br>Description<br>Method | Units | C09-10-1<br>80.0% COC-136<br>20.0% RP6935 | C09-10-2<br>80.0% COC-128<br>20.0% RP6935 | C09-1-6<br>40.00% COC-138<br>40.00% COC-78<br>20.00% COC-E | C09-10-6<br>40.00% COC-65<br>40.00% COC-78<br>20.00% COC-E |
|---|---|---|---|---|---|---|
| Haze | ASTM D1003-00 B | % | 15 | 17 | 91 | 59 |
| Clarity | ASTM D1003-00 B | % | 100 | 100 | 93 | 98 |
| Transmittance | ASTM D1003-00 B | % | 86 | 86 | 68 | 70 |
| Gloss (60°) | ASTM D2457 | — | 141 | 139 | 96 | 101 |
| HDT (0.455 Mpa/66 psi) (0.250-inch bars) | ASTM D648-07 Method B | ° F. | 262 | 248 | 206 | 153 |
| High Speed Pruncture | ASTM D3763-08 | | | | | |
| Thickness | | mil | 79 | 78 | 74 | 83 |
| Peak Force (Resistance) | | lbf | 528 | 560 | 447 | 483 |
| Deformation at Peak Force | | inches | 0.64 | 0.73 | 0.62 | 0.78 |
| Energy at Peak Force | | ft-lb | 15.6 | 20.3 | 0.62 | 19.2 |
| Total Energy | | ft-lb | 20.5 | 22.0 | 22.1 | 22.0 |
| Failure Mode | | | DUCTILE | DUCTILE | DUCTILE | DUCTILE |
| Flexural Modulus (tangent) (0.125-inch bars) | ASTM D790-07 Procedure A 0.0069 | psi | 319,000 | 318,000 | 330,000 | 281,000 |
| Flexural Strength* (0.125-inch bars) | ASTM D790-07 Procedure A | psi | 11,500 | 11,300 | 12,000 | 9,700 |
| Notched Izod Impact (0.250-inch bars) | ASTM D256-06a Method A 53.4 | ft-lb/in | 2.92 | 6.06 Complete | 0.78 Partial | 0.77 |

* = Flexural Stress at 5% Strain

TABLE 10

Twin Screw Compounding Conditions

| Structure | | Sample # | | |
|---|---|---|---|---|
| | | C10-1-1 | C10-2-2 | C10-14-14 |
| COC-138 | | 76.25% | 78.00% | |
| COC-128 | | | | 74.25% |
| Kraton RP6935 | | 20.00% | 20.00% | 20.00% |
| COC-E | | | 2.00% | 2.00% |
| OC51665431 | | 3.00% | | 3.00% |
| Licowax C | | 0.25% | | 0.25% |
| Hostanox 0101 | | 0.25% | | 0.25% |
| Irgafos 168 | | 0.25% | | 0.25% |
| Screw Speed | [1/min] | 400 | 360 | 360 |
| Torque | [%] | 83-84 | 70-90 | 81-83 |
| Power | [kW] | 7.5 | 5.0 | 5.0 |
| Rate | [lb/hr] | 50 | 50 | 50 |
| Specific Mechanical Energy | [kWh/kg] | 0.328 | | |
| $T_{melt}$ (° C.) | Die | 271 | 269 | 253 |
| PDie (psig) | Die | 300 | 264 | 270 |
| | | Set Act | Set Act | Set Act |
| $T_1$ [° C.] | Brl #4/5 | 100 100 | 100 100 | 100 99 |
| $T_2$ [° C.] | Brl#6 | 220 220 | 220 221 | 220 220 |
| $T_3$ [° C.] | Brl #7/8 | 220 219 | 220 219 | 220 219 |
| $T_4$ [° C.] | Brl #9/10 | 220 219 | 220 218 | 220 219 |
| $T_5$ [° C.] | Brl #11/12 | 220 220 | 220 221 | 220 220 |
| $T_7$ [° C.] | Brl # 13 | 220 220 | 220 220 | 220 220 |
| $T_8$ [° C.] | Die Plate | 240 240 | 240 240 | 240 240 |
| Vac #1 (" Hg) | Brl# 11/12 | 25 | atm. | 27 |
| Feeders | | | | |
| Main | lb/hr | 50 | 50 | 50 |
| Nitrogen | CFH | 15 | 15 | 15 |

TABLE 11

Properties of COC Compounds with Additives
Physical Properties

| Structure | | Sample # | | |
|---|---|---|---|---|
| | | C10-1-1 | C10-2-2 | C10-14-14 |
| COC-138 | | 76.25% | 78.00% | |
| COC-128 | | | | 74.25% |
| KratonRP6935 | | 20.00% | 20.00% | 20.00% |
| COC-E | | | 2.00% | 2.00% |
| OC51665431 | | 3.00% | | 3.00% |
| Licowax C | | 0.25% | | 0.25% |
| Hostanox 0101 | | 0.25% | | 0.25% |
| Irgafos 168 | | 0.25% | | 0.25% |
| HDT (0.455 MPa/ 66 psi) (° F.) | ASTM D648-07 | 248 | 254 | 234 |
| Haze (%) | ISO 14782 | 15.9 | 14.1 | 15.4 |
| Transmittance (%) | ISO 13468-2 | 86.4 | 83.9 | 82.2 |
| Gloss (60°) | ASTM D2457 | 123 | 129 | 129 |
| High Speed Puncture | ASTM D3763-08 | | | |
| Thickness | mil | 79 | 79 | 79 |
| Peak Force (Resistance) | lbf | 555 | 553 | 578 |
| Deformation at Peak Force | inches | 0.75 | 0.65 | 0.74 |
| Energy at Peak Force | ft-lb | 19.8 | 15 | 19.9 |
| Total Energy | ft-lb | 21.3 | 20.5 | 21.5 |
| Failure Mode | | ductile | ductile | ductile |

Without intending to be bound by any particular theory, pre-compounding may provide a more homogenous mix and reduce the likelihood of COC gels and unmelts in HDPE; thereby eliminating obvious causes for poor performance.

It is seen in Table 12 that pre-compounding HDPE with 5 to 15 percent COC (COC-110) using a 30-mm Leistritz twin screw extruded did not change melt flow behavior of HDPE in any deleterious manner.

TABLE 12

Twin Screw Extrusion for HDPE-COC
Twin Screw Compounding Conditions for HDPE-COC

| Sample | AA | Control | BB | CC | DD |
|---|---|---|---|---|---|
| TOTAL SB 1359 | 100 | | 95 | 90 | 85 |
| TOPAS COC-110 | | 100 | 5 | 10 | 15 |
| Barrel Temperatures | | | | | |
| Zone 1 (° C.) | | | 130 | 130 | 130 |
| Zone 2 (° C.) | | | 225 | 225 | 225 |
| Zone 3 (° C.) | | | 230 | 230 | 230 |
| Zone 4 (° C.) | | | 235 | 235 | 235 |
| Die & Nozzle (° C.) | | | 240 | 240 | 240 |
| Melt Temperature (° C.) | | | 223 | 220 | 231 |
| Extrusion Settings | | | | | |
| Throughput (lb./hr.) | | | 15.1 | 14.7 | 14.0 |
| Torque (%) | | | 65 | 70 | 77 |
| Screw Speed (RPM) | | | 125 | 125 | 125 |
| Die Pressure (bar) | | | 160 | 160 | 160 |
| Melt Index | | | | | |
| 190° C.; 2.16 kg (dg/min) | 2.3 | 0.7 | 2.3 | 2.4 | 2.4 |

Dynamic Mechanical Analysis

Dynamic mechanical thermal analysis (DMTA) measures elastic modulus (E'), viscous modulus (E") and tan delta as a function of temperature. Using test protocols guided by ASTM D4065 and similar international standards, DMTA was measured with RSA-III (Rheometrics Scientific Inc) instrument. Test geometry—length, width, and thickness, for COC-110 the specimen was 50 mm×10 mm×4 mm cut from ISO injection molded tensile bar. Test geometry for HDPE (SB 1539) and HDPE with 15% COC-110 specimens were 40 mm×10 mm taken from the middle of the bottle in the axial direction. Deformation mode for COC-110 was bending (compression). Deformation mode for HDPE and HDPE with 15% COC-110 was stretching (tension). Heating rate for COC-110 was 2° C./min and for HDPE and HDPE with 15% COC-110 was 4° C./min. All samples were run at 0.02% strain and 1 Hz frequency.

Figure 3:
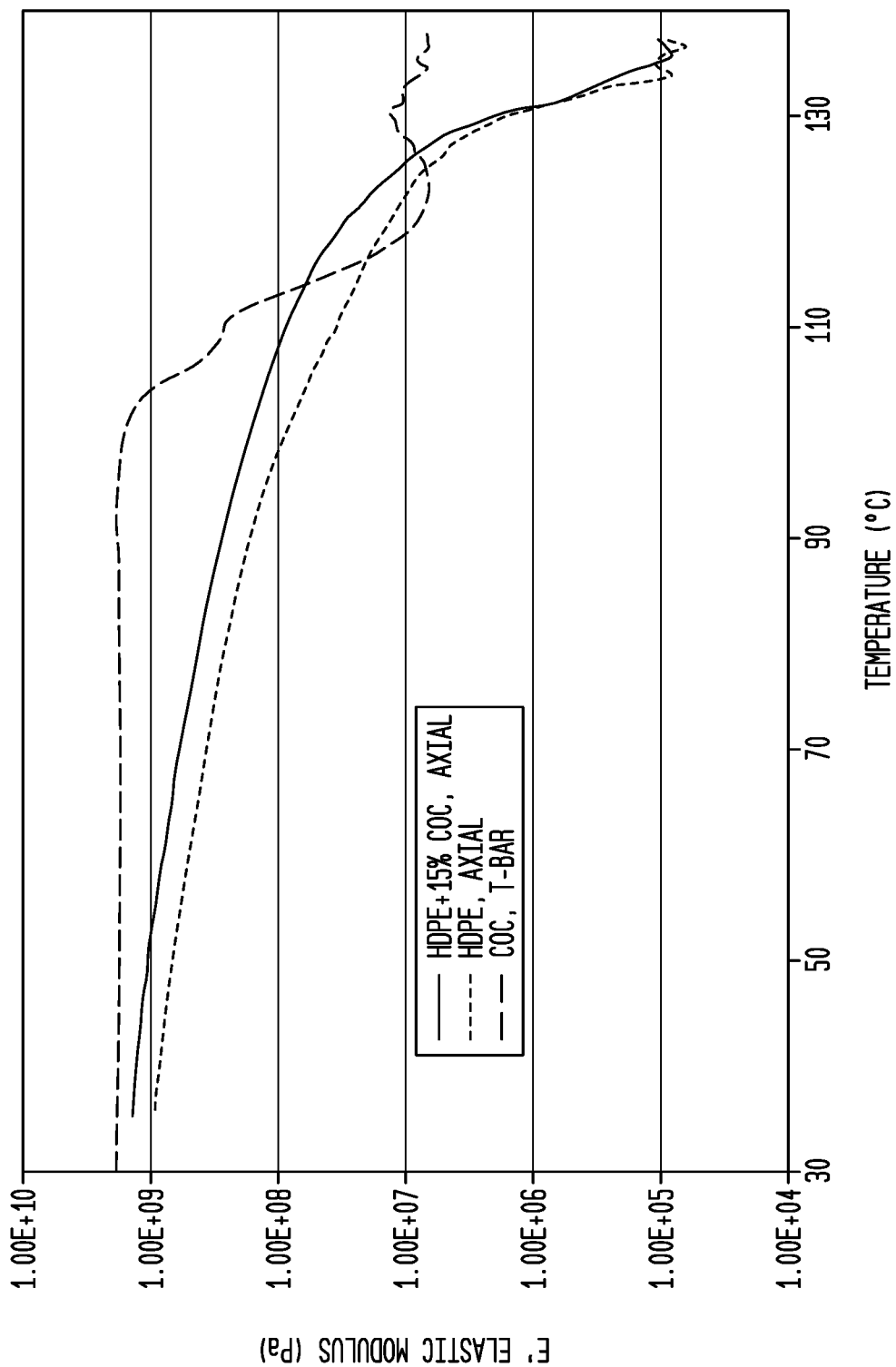
FIG. 3 is a plot of elastic modulus of bimodal HDPE melt-blended with COC, as well as the bimodal HDPE and COC components.

In FIG. 3, the elastic modulus, E', is shown as a function of temperature for three materials. COC-110 (long dash line) is an amorphous polymer with 110° C. glass transition temperature, denoted as change in slope. Semi-crystalline HDPE (1359) does not have any sharp thermal transitions. Elastic modulus (short dash line) declines at a faster rate as ambient testing temperature approaches crystalline melting point of HDPE. Addition of 15% COC-110 to HDPE shifts the temperature elastic modulus curve to the right. The reheated HDPE/COC preforms benefit from the greater stiffness at elevated stretching temperatures, which enables more uniform material distribution in the bottle wall as will be appreciated from the examples appearing hereinafter.

ISBM

ISBM is practiced in so called single-step and two-step processes. In a single-step process, preforms are injection molded, cooled and conditioned, reheated and blown into a bottle. This is done on one machine in the single-step ISBM process machine. In the two-step process, (also called reheat stretch blow-molding), preforms are injection molded and cooled. Preforms are taken to a second machine where they are reheated, stretched and blown into bottles. Advantages of the two-step process include: very high volumes are produced; little restriction on bottle design; preforms can be sold as a completed item for a third party to blow; and the process is suitable for cylindrical, rectangular or oval bottles. Advantages of the single-step process include: suitability for low volumes and short runs; as the preform is not released during the entire process the preform wall thickness can be shaped to allow even wall thickness when blowing rectangular and non-round shapes; and the single-step process readily accommodates multi-layer preforms.

United States Patent Application Publication No. US 2013/0192173 and United States Patent Application Publication No. US 2014/0004285 provide details on ISBM of bimodal HDPE preforms into containers and is directed to a container prepared from a high density polyethylene (HDPE) resin comprising: two polyethylene fractions comprising a fraction A and fraction B, fraction A being substantially free of comonomer and having a lower weight average molecular weight and a higher density than fraction B, each fraction prepared in different reactors of two reactors connected in series in the presence of a metallocene-containing catalyst system. Similar disclosure is found in United States Patent Application Publication No. US 2014/0050873.

Figure 6:
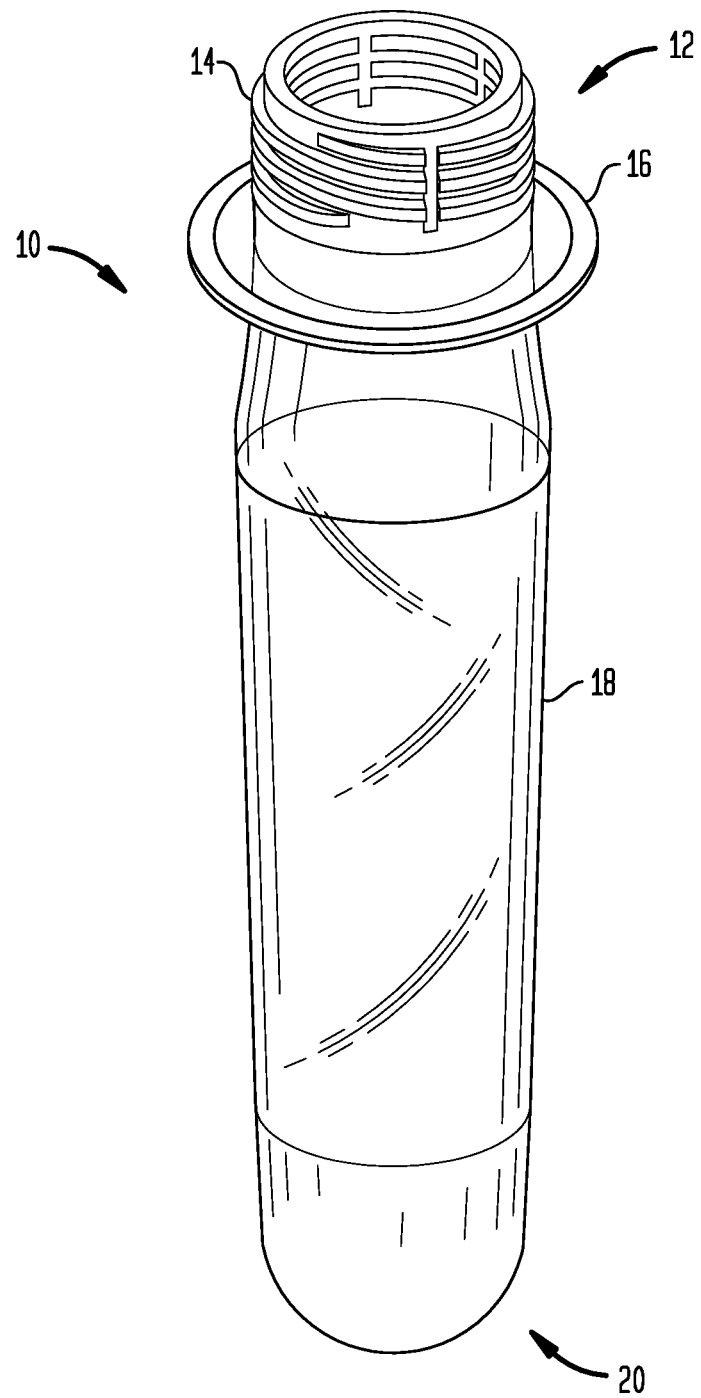
FIG. 6 is a perspective view of a preform used in ISBM.

The ISBM process is described in detail in Brandau, O., Stretch Blow Moulding, $3^{rd}$ Ed., Elsevier, 2017. As a first step, an injection molded preform is produced, generally having the characteristics shown in FIG. 6. Preform 10 is shaped like a test tube and has an upper portion 12 provided with threads 14, a ring 16 used for handling the preform and heat-shielding the threads, a sidewall 18 and a bottom 20. After cooling, preform 10 is reheated in an oven section (see Brandau, Chapter 4, pp. 49-57), after inverted with the threads down, with a plurality of IR head lamps arranged vertically to provide a plurality of horizontal heating "zones" that can be controlled individually and by the overall power to the lamps. After retracting, the preform is stretched with a rod and blown into the container shape. See Brandau, Chapter 6, pp. 81-88. The relative dimensions of the preform and container are shown in Figure 6.2 of Brandau and stretch ratios are calculated.

"Axial" and "hoop stretch" ratios are characteristics of a blow-molded article with respect to its perform and express the amount of expansion a preform undergoes to make the blow-molded article. "The Blow-Up Ratio" (BUR) is a combined ratio in which the axial stretch ratio is multiplied by the hoop stretch ratio to give an overall or blow-up ratio. For present purposes, equations for calculating the axial, hoop, and blow-up ratios are as follows:

$$\text{Axial Stretch Ratio} = \frac{La}{Lp}$$

$$\text{Hoop Stretch Ratio} = \frac{Da}{Dp}$$

wherein:
Da=the maximum inside diameter of the article at the midpoint height
Dp=the minimum inside diameter of the preform at the midpoint height
La=the length of the article below the neck (typically measured from the capping ring, above which the perform is not stretched, minus 0.100 inch to the top of the push-up on the inside of the article)
Lp=the length of the preform below the neck (typically measured from the capping ring minus 0.100 inch to the bottom of the inside surface of the preform)

For articles or preforms with a non-circular cross-section, the diameters employed for purposes of calculating the draw ratio may be based on the corresponding cross-sectional area, for instance, the diameter may be taken as the square root of 4/π times the corresponding area. For irregular shapes, the weighted average diameters may be used.

Figure 7:
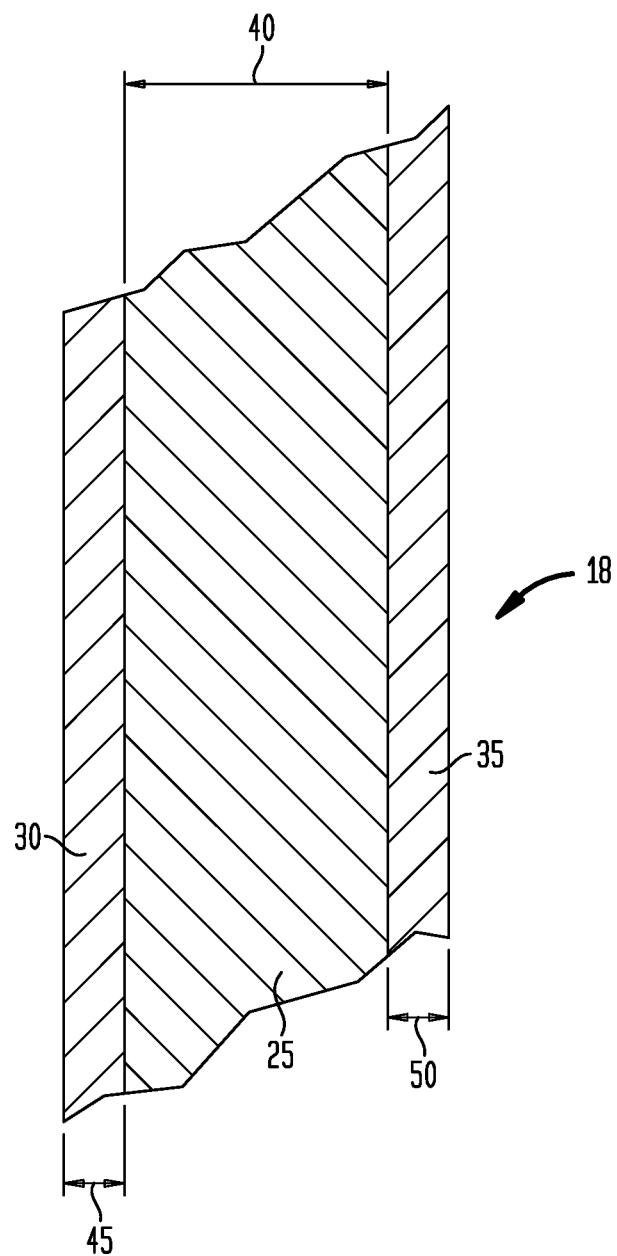
FIG. 7 is a diagram illustrating a sidewall of a multilayer preform.

Multilayer preforms with an HDPE core and inner and outer amorphous cycloolefin polymer "skins" may be prepared by co-injection as known in the art; for example, as is seen in U.S. Pat. No. 7,871,558 to Merical et al. noted above. There is shown schematically in FIG. 7 a portion of a sidewall 18 of a multi-layer preform suitable for use in connection with the present invention, which instead of being a monolayer preform, includes a semi-crystalline polyolefin core 25 sandwiched between a pair of amorphous polyolefin skin layers 30, 35 as shown. Core 25 has a thickness 40 of 3-5 times the aggregate thickness 45, 50 of the skin layers.

Multilayer preforms with discrete layers of alicyclic polyolefins are believed particularly advantageous since alicyclic polyolefins can exhibit strain hardening, which is readily observed in multilayer structures. Thus, discrete layers of COC, for example, impart strength to the preform as it is stretched and blown into shape and may ameliorate the adverse effects of defects in the preform. Strain hardening occurs during monoaxial and biaxial orientation. Having discrete layers consisting essentially of or consisting of alicyclic polyolefins amplifies the effect of strain hardening inherent in the alicyclic polyolefins.

Amorphous polymers, especially COC, can be uniaxially or biaxially oriented to improve mechanical properties, particularly toughness and durability. Plastic deformation resistance created from the dispersion of discrete domains of COC into an HDPE matrix can be improved even further by using one or more discrete COC layers in multilayer preforms. One or more discrete layers of COC in multilayer preform with other polyolefins such as HDPE, LDPE, LLDPE and PP enables the structure to adequately strain harden for ISBM processing. Strain hardening is illustrated in the following multilayer COC-polyolefin structures.

In one series of tests measurements were performed on a Bruckner-Karo laboratory stretch testing unit. A 250-micron three-layer structure consisting of COC-68/PE/COC-68 in layer ratio of 30/40/30 percent was stretched monoaxially in transverse direction. The polyethylene (PE) was Dowlex SC2107; measurements were made at a constant stretching rate of 25% per second. Maximum draw ratio at 80° C. and 85° C. was 1×4.1 and 1×5.3 respectively. Specimens were heat soaked for 50 seconds prior to stretching. Maximum stress was 2.6 N/mm² and 2.3 N/mm². Results in FIG. 8 show gradual increase in stress as the sample is stretched indicating strain hardening. At 85° C. stretching temperature, strain hardening occurs as the rate strain or stretching speed increases from 10% per second to 100% per second. Effect of stretching speed is shown in the graph of FIG. 9. All test show gradual increase in stress as the sample is stretched indicating strain hardening. More stress occurs by increasing stretching speed. At 10%, 25%, 50% and 100% per second stretching speeds, maximum stress is about 1.8, 2.2, 2.35 and 2.75 N/mm². Transverse direction draw ratio was 1×5 at temperature of 85° C. Considering change in sample dimension, true draw ratio was 5.2. Difference in tensile properties occurred between oriented and non-oriented films. Tensile strength of the TD oriented film nearly double to more than 134 N/mm² and elongation at break increased by about a third to 107 percent. Modulus of elasticity was 1,508 N/mm².

In another series of tests, a five-layer 290-micron structure consisting of PE/COC-78/PE/COC-78/PE in layer ratio of 4/14/64/14/4 was tested. The PE was Dowlex 2108 LLDPE. This film was biaxially stretched at constant speed of 50% per second. Stretching ratios at 110° C. and 120° C. were 4×4 and 6.5×6.5 respectively. All samples were heated for 30 seconds at the stated temperature prior to stretching. At the maximum draw ratio, stress after 4×4 and 6.5×6.5 stretch ratios were 2.9 N/mm² and 1.0 N/mm². Results in FIG. 10 show gradual increase in stress as the sample is stretched indicating strain hardening.

Depending on specific application requirement, including bottle performance and polymeric materials blowing characteristics, preform designs usually go beyond simple length, diameter, and thickness geometries to include tapered profile thickness along inner, outer walls and sometimes both, depending on the material. See Brandau, Chapter 9, pp. 140-145. Preform dimensions for Boston Round personal care and Dairy style bottles are shown in Table 13.

TABLE 13

Preform Dimensions

| Preform Dimensions (mm) | Overall Length | Body Length, L | Outer Diameter | Wall Thickness, t | L/t |
|---|---|---|---|---|---|
| Boston Round | 90 | 76.5 | 33 | 4.03 | 19 |
| Dairy | 120 | 107.5 | 36 | 3.11 | 35 |

Figure 11A:
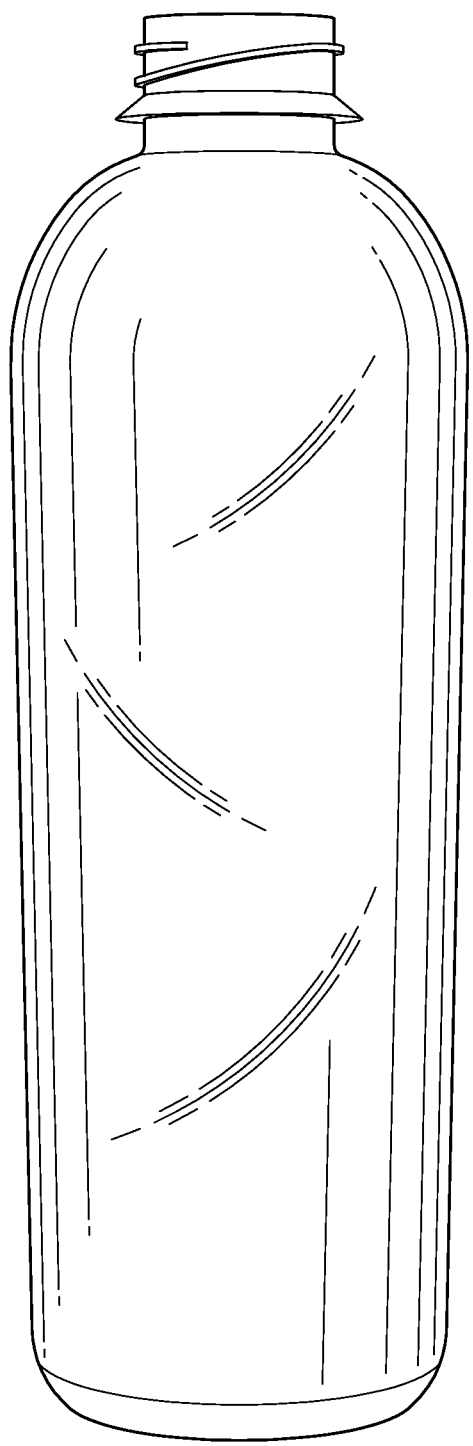
FIGS. 11A and 11B are drawings of Boston Round and Dairy ISBM containers, respectively.
Figure 11B:
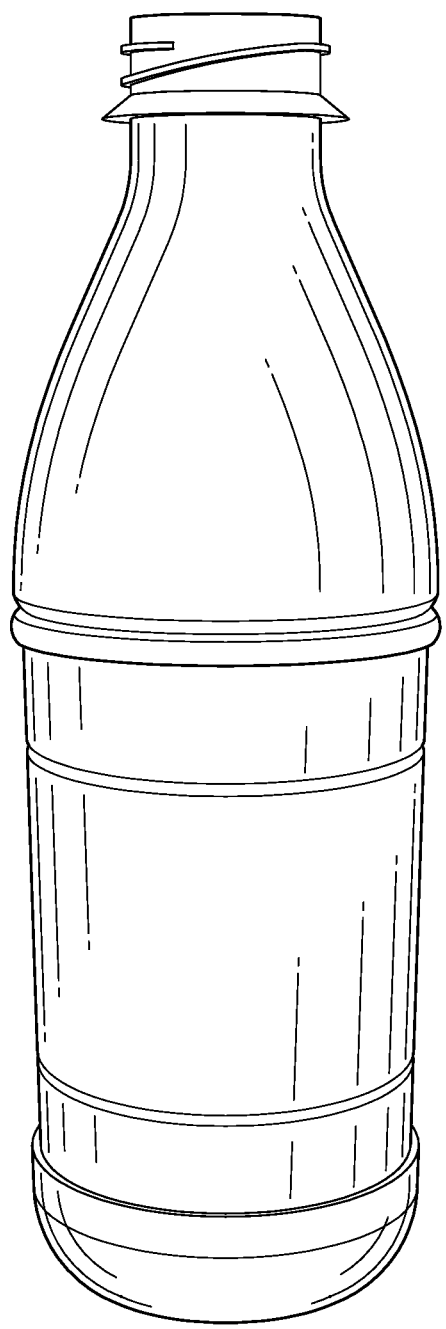

Compounded materials described in Table 12 were injection molded on an Arburg 320 M unit cavity injection molding machine outfitted with 35-mm general purpose plasticating screw without mixing elements. Preform injection molding conditions for HDPE-COC blends for Boston Round bottle are summarized in Table 14. The Boston Round and Dairy bottle shapes are shown in FIGS. 11A and 11B.

TABLE 14

Representative Preform Injection Molding Conditions

| | Sample ID# | | | |
|---|---|---|---|---|
| Description | A1 Total SB1359 | B1 5% TOPAS COC COC-110 + 95% Total SB1359 | C1 10% TOPAS COC COC-110 + 90% Total SB1359 | D1 15% TOPAS COC COC-110 + 85% Total SB 1359 |
| Part Weight (g) | 24.7 | 24.9 | 25.0 | 24.7 |
| Barrel Temperatures | 219 | 222 | 222 | 220 |
| Feed (° C.) | 230 | 231 | 231 | 230 |
| Zone 2 (° C.) | 230 | 230 | 229 | 230 |
| Zone 3 (° C.) | 230 | 230 | 230 | 230 |

TABLE 14-continued

Representative Preform Injection Molding Conditions

| Description | Sample ID# | | | |
|---|---|---|---|---|
| | A1 Total SB1359 | B1 5% TOPAS COC COC-110 + 95% Total SB1359 | C1 10% TOPAS COC COC-110 + 90% Total SB1359 | D1 15% TOPAS COC COC-110 + 85% Total SB 1359 |
| Zone 4 (° C.) | 240 | 240 | 239 | 240 |
| Nozzle (° C.) | 219 | 222 | 222 | 220 |
| Injection Parameters | | | | |
| Max Inj. Pressure (bar) | 1000 | 1000 | 1000 | 1000 |
| 1st Inj. Speed (ccm/sec) | 12.0 | 12.0 | 12.0 | 12.0 |
| Plastic Pressure (bar) | 520 | 510 | 510 | 510 |
| Holding Pressure | | | | |
| Switch-Over Point (ccm) | 5.0 | 5.0 | 5.0 | 5.0 |
| 1st Hold Pressure (bar) | 250.0 | 250.0 | 250.0 | 250.0 |
| Dosage Parameters | | | | |
| Circumf. Speed (m/min) | 8.0 | 8.0 | 8.0 | 8.0 |
| Back Pressure (bar) | 25.0 | 25.0 | 25.0 | 25.0 |
| Dosage Volume (ccm) | 35.0 | 35.0 | 35.0 | 35.0 |
| Cushion (ccm) | 1.3 | 1.2 | 1.9 | 2.1 |
| Process Times | | | | |
| Fill (sec) | 3.0 | 3.0 | 3.0 | 3.0 |
| Total Hold (sec) | 6.0 | 6.0 | 6.0 | 6.0 |
| Meas. Dosage (sec) | 7.7 | 8.0 | 7.6 | 7.4 |
| Cooling Time (sec) | 22.0 | 22.0 | 22.0 | 22.0 |
| Cycle Time (sec) | 36.5 | 36.5 | 36.5 | 36.5 |

The injection molding process was established considering typical quality criteria including residual stress, and variation in wall thickness around the body of the preform, or concentricity. Preforms were produced with a hot runner, but cold sprue. Mold temperature was 50° F. Blow-molding the preform includes, reheating the preform after it is injection molded, stretching the preform with a solid or hollow stretch rod prior to blow-molding, and then blow-molding the container, usually first with a low pressure and then with high pressure. Alternatively, uniform pressure may be used.

EXAMPLES

In the examples which follow ISBM processing of preforms based on COC/semi-crystalline polyolefin melt blends is compared with semi-crystalline polyolefin based preforms. It is seen that the alicyclic polyolefin composition unexpectedly and dramatically increases the processing window of semi-crystalline polyolefins as well as enhances material distribution in the product.

Example Series 1

Bottles were blow-molded on a Sidel SBO1 blow-molding system. Blow-molding optimization process was optimized for 20 oz. Boston round mold for all neat bimodal HDPE and three bimodal HDPE-COC compounds. Bottle conditions were adjusted to try to minimize a thick band of material around the bottle sidewall area. These adjustments included changes to the preform reheating, timing, stretching speed, and air pressure used to blow the bottle. This thick band of material corresponded to the location of the transition from thick to thin in the preform wall. Bottles were produced for each material variable at the conditions shown in Table 15.

TABLE 15

Reheat Stretch Blow-Molding Conditions

| Resin | Sample ID# | | | |
|---|---|---|---|---|
| | 1 A 1 Total SB1359 | 1 B 1 5% TOPAS COC COC-110 + 95% Total SB1359 | 1 C 1 10% TOPAS COC COC-110 + 90% Total SB1359 | 1 D 1 15% TOPAS COC COC-110 + 85% Total SB1359 |
| Speed (bottle per hour) | 600 | 600 | 600 | 600 |
| Overall Power (%) | 77 | 79 | 83 | 82 |
| Oven Lamp Settings (%) | | | | |
| Zone 6 | 20 | 20 | 20 | 20 |
| Zone 5 | 25 | 25 | 25 | 25 |
| Zone 4 | 55 | 55 | 55 | 50 |
| Zone 3 | 100 | 100 | 80 | 75 |
| Zone 2 | 30 | 30 | 60 | 65 |

TABLE 15-continued

Reheat Stretch Blow-Molding Conditions

| | Sample ID# | | | |
|---|---|---|---|---|
| Resin | 1 A 1 Total SB1359 | 1 B 1 5% TOPAS COC COC-110 + 95% Total SB1359 | 1 C 1 10% TOPAS COC COC-110 + 90% Total SB1359 | 1 D 1 15% TOPAS COC COC-110 + 85% Total SB1359 |
| Zone 1 | 35 | 35 | 10 | 10 |
| Stretching Speed (m/s) | 2 | 2 | 2 | 2 |
| Preform Temperature. (° C.) | 115-120 | 116-121 | 116 | 115-121 |
| Blow Timing/Pressures | | | | |
| Low Blow Position (mm) | 230 | 230 | 230 | 230 |
| Low Pressure (bar) | 7 | 7 | 7 | 7 |
| High Blow Position (mm) | 300 | 300 | 300 | 300 |
| High Blow Pressure (bar) | 20 | 20 | 20 | 20 |
| Pre-blow Flow (bar) | 3 | 3 | 3 | 3 |
| Body Mold Temp (° F.) | 45 | 45 | 45 | 45 |
| Base Mold Temp. (° F.) | 45 | 45 | 45 | 45 |

The open or "finish" (threads) end of the reforms are loaded onto sequential spindles attached to drive chain. Bottom or preform tip is facing upward. IR lamps are installed on horizontal arrays, which power input can be controlled independently. IR pyrometer is mounded at the exit of the oven. It targets the temperature at the center of the preform body. Hot preform is picked up by a mechanical arm, inverted and mounted into the blow-molding unit.

The bottles produced had the wall thickness distribution shown in Table 16.

TABLE 16

Bottle Wall Thickness (mil)

| | Sample ID# | | | |
|---|---|---|---|---|
| Bottle Height (mm) | 1 A 1 Total SB1359 | 1 B 1 5% TOPAS COC-110 + 95% Total SB1359 | 1 C 1 10% TOPAS COC-110 + 90% Total SB1359 | 1 D 1 15% TOPAS COC-110 + 85% Total SB1359 |
| 175 | 14 | 18 | 9 | 8 |
| 165 | 40 | 57 | 45 | 7 |
| 130 | 11 | 22 | 12 | 12 |
| 120 | 9 | 15 | 10 | 22 |
| 110 | 7 | 12 | 8 | 15 |
| 93 | 9 | 10 | 8 | 13 |
| 78 | 10 | 9 | 8 | 11 |
| 55 | 10 | 10 | 8 | 14 |
| 32 | 15 | 16 | 9 | 15 |
| 20 | 18 | 23 | 10 | 21 |
| 10 | 20 | 32 | 11 | 26 |
| Average | 14.8 | 20.4 | 12.5 | 14.9 |
| Standard Deviation | 9.3 | 14.0 | 10.8 | 5.9 |

Preforms were scribed to give an indication of the stretching of a given preform location into the bottle. For samples A & B, the scribed lines on the bottles were very similar in appearance, showing uneven longitudinal material distribution near the bottle neck. For sample C, material is stretched more longitudinally as the scribed lines and material band moved lower down the bottle sidewall. These observations were quantified by measuring the average and standard deviation of bottle sidewall thickness as shown in Table 16. Lower standard deviation is indicative of more even longitudinal material distribution. Material distribution is one of the key benefits of adding COC to HDPE.

Tables 17, 18 list typical bottle characteristics.

TABLE 17

Tables 17, 18 list typical bottle characteristics.
Bottle Dimensions and Stretch Ratios

| Bottle Dimensions (mm) | Overall Length | Body Length, L | Outer Diameter | Axial Stretch Ratio | Radial (Hoop) Stretch Ratio | BUR |
|---|---|---|---|---|---|---|
| Boston Round | 213 | 194 | 66 | 2.53:1 | 2:1 | 5.06 |
| Dairy | 250 | 230 | 85 | 2.14:1 | 2.4:1 | 5.14 |

TABLE 18

Bottle Weight and Volume

| | Weight, gram | Volume, ml (fl. oz.) |
|---|---|---|
| Boston Round | 25.0 | 591.7 (20.0) |
| Dairy | 31.6 | 1000 (33.8) |

Good material distribution during blow-molding is strongly influenced by preform geometries including blow-up ratio; and pre-form length, diameter, and wall thickness. Bottle molds are designed to provide the required mechanical performance and desired shape. Pre-forms are designed to enable desired material distribution during reheat stretch blow-molding process. Both tools are usually designed together. HDPE exhibits little, if any, strain hardening. More stretching and less blowing is preferred for reheat ISBM of HDPE. The opposite is true for reheat ISBM of PET. Preform design must account for process preference for HDPE. L/t (preform length/preform wall thickness) ratio is much higher, 35, for the Dairy bottle versus 19 for the Boston Round. Improved material distribution is expected even though BUR is similar for both.

Example Series 2

Dairy bottles were produced during the second case study. The materials were injection molded on an Arburg 320 M unit cavity injection molding machine outfitted with a general-purpose screw for the neat HDPE and a mixing screw and tip for the HDPE-COC blends. Mixing screw and tip in the plasticating unit were sufficient to intimately melt mix HDPE and COC pellets, without an additional pre-compounding step. Many commercial pre-form molding operations rely solely on blending and melt mixing in the injection molding machine. Injection molding conditions are provided in Table 19.

TABLE 19

Optimized Preform Injection Molding Conditions

| Variable Description | Sample ID# | | | |
|---|---|---|---|---|
| | 2 A<br>HDPE SB1539 | 2 D<br>HDPE + 10%<br>TOPAS COC-65 | 2 E<br>HDPE + 15%<br>TOPAS COC-65 | 2 H<br>HDPE + 15%<br>TOPAS COC-110 |
| Preform Wt. (g) | 31.2 | 31.5 | 31.6 | 31.7 |
| Mold Temp (° F.) | 60 | 60 | 60 | 60 |
| Barrel Temperatures | | | | |
| Feed (° C.) | 221 | 221 | 221 | 221 |
| Zone 2 (° C.) | 230 | 230 | 230 | 230 |
| Zone 3 (° C.) | 230 | 230 | 231 | 230 |
| Zone 4 (° C.) | 230 | 230 | 230 | 230 |
| Nozzle (° C.) | 240 | 240 | 243 | 239 |
| Injection | | | | |
| Injection Press. (bar) | 1000 | 1000 | 1000 | 1000 |
| Injection Time (sec) | 3.8 | 3.9 | 3.9 | 4 |
| $1^{st}$ Injection Speed (ccm/sec) | 12 | 12 | 12 | 12 |
| $2^{nd}$ Injection Speed (ccm/sec) | 10 | 10 | 10 | 10 |
| Holding Pressure | | | | |
| Switch-Over Point (ccm) | 6.5 | 6.5 | 6.5 | 6.5 |
| 1st Hold Pressure (bar) | 125 | 125 | 250 | 250 |
| 1st Hold Pr. Time (sec) | 3.5 | 3.5 | 3.5 | 3.5 |
| Remain Cool Time (sec) | 12 | 12 | 12 | 12 |
| Dosage | | | | |
| Circumf. Speed (m/min) | 8 | 8 | 8 | 8 |
| Back Pressure (bar) | 25 | 25 | 25 | 25 |
| Dosage Volume (ccm) | 47 | 47 | 47 | 47 |
| Dosage Time (sec) | 9.8 | 9.4 | 10.6 | 10.8 |
| Cushion (ccm) | 2.9 | 3.5 | 1.9 | 2 |
| Process & Preform Data | | | | |
| Cycle Time (sec) | 25.1 | 25 | 25 | 25.2 |

The injection molding process was established considering typical quality criteria including residual stress and variation in wall thickness (concentricity).

Bottles were blow-molded on a Sidel SBO1 blow-molding system. The blow-molding optimization process began with a generic heating profile and the neat HDPE material. The bottle conditions were adjusted to try to eliminate a thick band of material from the bottle panel sidewall area and eliminate bottle blowouts. These adjustments included changes to the preform reheating, timing, stretching speed, and air pressure used to blow the bottle. It was observed that the material was very sensitive to small adjustments to the heating; preforms would not blow into acceptable bottles when placed directly next to one another on the machine spindles. These conditions are summarized in Table 20.

TABLE 20

Bottle Blow-Molding Conditions

| Resin | Sample ID# | | | |
|---|---|---|---|---|
| | 2 A<br>TOTAL<br>HDPE<br>SB1359 | 2 D<br>HDPE +<br>10%<br>TOPAS<br>COC-65 | 2 E<br>HDPE +<br>15%<br>TOPAS<br>COC-65 | 2 H<br>HDPE +<br>15%<br>TOPAS<br>COC-110 |
| Speed (bottle per hr.) | 70 | 70 | 80 | 400 |
| Overall Power Input | 70 | 72 | 71 | 71 |
| Oven Lamp Settings | | | | |
| Zone 6 | 85 | 85 | 79 | 75 |
| Zone 5 | 50 | 47 | 46 | 45 |
| Zone 4 | 60 | 60 | 62 | 63 |
| Zone 3 | 25 | 32 | 36 | 41 |
| Zone 2 | 30 | 28 | 35 | 35 |
| Zone 1 | 50 | 47 | 50 | 50 |
| Stretching Speed | 0.95 | 1.1 | 1.45 | 1.45 |
| Preform Temp. (° C.) | 117 | 117 | 117 | 118 |
| Blow Timing/Pressures | | | | |
| Cycle Time | 3.17 | 3.17 | 3.17 | 3.17 |
| Low Blow Position (mm) | 205 | 195 | 210 | 200 |
| Low Pressure (bar) | 5.5 | 5.5 | 5.5 | 5.5 |
| High Blow Position (mm) | 325 | 325 | 325 | 325 |
| High Blow Pressure (bar) | 25 | 25 | 25 | 25 |
| Preblow Flow (bar) | 2 | 0.25 | 0.25 | 3 |
| Body Mold Temp (° F.) | 45 | 45 | 45 | 45 |
| Base Mold Temp. (° F.) | 45 | 45 | 45 | 45 |

HDPE (SB1359) was very sensitive to small adjustments to the heating; preforms would not blow into acceptable bottles when placed directly next to one another on the machine spindles. Therefore, preforms were loaded every tenth spindle, reducing bottle per hour production rating of the machine from 700 to 70. As much as 50% scrap was encountered. 90/10 HDPE/COC-65 and 85/15 HDPE/COC-65 were very sensitive to process heating adjustments also.

Bottle per hour rates and amount of scrap were similar to HDPE, suggesting COC-65 provided little or no benefit to process efficiency of HDPE reheat ISBM. 85/15 HDPE/COC-110, higher $T_g$ grade, produced bottles with a much more even sidewall distribution after minor process changes. This blend was far less sensitive to process temperature changes, enabling bottles to be blown from preforms placed on every second spindle. Bottles were made at a rate of 400 per hour at less than 2 percent scrap. Simply increasing COC Tg to 110° C., everything changed for the better, including material distribution in the bottle and especially process window. COC dramatically stabilized the HDPE, enabling it to be more forgiving in the reheat ISBM process.

Bottle wall thickness was measured in several increments along the axial length. Measurements are summarized in Table 21. Standard deviation of these measurements is indicative of material distribution. 85/15 HDPE/COC-110 had the lowest standard deviation, 3.4, which is less than 3.9 for HDPE. Material distribution was uniform except for a narrow thickness band near the middle of the bottle. HDPE bottle production was less consistent, and exhibited poorer material distribution with the lower quarter of the bottle thicker than the upper three quarters. Poor material distribution usually correlates with poor mechanical performance and overall bottle integrity. Material distribution was visually apparent.

TABLE 21

Bottle Wall Thickness (mil)

| | Sample ID # | | | |
|---|---|---|---|---|
| Bottle Height (in) | 2 A 1 TOTAL HDPE SB1359 | 2 D HDPE + 10% TOPAS COC-65 | 2 E HDPE + 15% TOPAS COC-65 | 2 H HDPE + 15% TOPAS COC-110 |
| 8.01 | 13 | 12 | 9 | 13 |
| 6.92 | 10 | 10 | 7 | 16 |
| 5.06 | 13 | 14 | 13 | 23 |
| 4.14 | 14 | 18 | 30 | 17 |
| 2.55 | 20 | 26 | 19 | 14 |
| 1.59 | 20 | 20 | 16 | 14 |
| 1.04 | 17 | 14 | 13 | 12 |
| 0.35 | 20 | 15 | 16 | 16 |
| Average | 15.9 | 16.1 | 15.4 | 15.6 |
| Standard Deviation | 3.9 | 5.1 | 7.1 | 3.4 |

Drop Impact Resistance Testing

For each bottle composition, 21 bottles were filled with water and then allowed to equilibrate to room temperature overnight. The capped bottles were then dropped in the vertical position from a platform onto a marble slab. The initial drop height was 24 inches; however, a test setup bottle from each set was dropped from as high as 96" without failure. Therefore, the bottles were placed into a 4° C. storage chamber and allowed to re-equilibrate prior to testing. Once equilibrated, a setup bottle from each set was again dropped from the vertical orientation at a drop height of 96" without failure. The same setup bottles were then dropped from the horizontal position and failures were observed in the bottles conditioned at 4° C. storage. Therefore, this orientation and test temperature were used throughout the testing to differentiate failure among the material composition.

With the Bruceton staircase method (ASTM D2463-10a), if the dropped bottle did not break or delaminate upon impact, the drop height was raised by six inches and the process was repeated until a failure occurred. If the bottle did not pass at a given height, the platform height was then lowered by six inches and the bottle would be dropped from that height, repeating the process of increasing the drop height upon passing and decreasing the drop height upon failure until all container samples were tested. Any bottle delamination was considered a test failure. The mean and standard deviation were then calculated for each set according to the following equations:

$$\overline{X} = C + \left( \frac{d \times \sum i n_i}{\sum n_i} \right) - 0.5d$$

and $$\sigma = 1.62 d \times \left( \frac{\sum n_i (\sum i^2 n_i) - (\sum i n_i)^2}{(\sum n_i)^2} + 0.029 \right)$$

where C=the lowest impact level for a failure d=the step size between impact intervals N=the total number of samples that failed i=the test interval with zero at the lowest level, increasing by one unit $n_i$=the number of samples which failed at any given test interval Test results are summarized in Table 22. Drop impact resistance is a very strong function of material distribution, preform and bottle tooling design. In this case, the bottle failures occurred primarily in the upper shoulder seam, which is formed along the parting line between blow-mold halves.

TABLE 22

Bruceton Staircase Drop Impact Test Results

| Sample # | Preform/Bottle | X (in.) | σ (in.) | C (in.) | N | Max. Passing (in.) |
|---|---|---|---|---|---|---|
| 2 A | HDPE Total SB 1359 | 23.9 | 7.0 | 14 | 7 | 26 |
| 2 D | HDPE + 10% TOPAS COC-65 | 17.0 | 12.7 | 8 | 11 | 26 |
| 2 E | HDPE + 15% TOPAS COC-65 | 14.6 | 4.6 | 8 | 10 | 20 |
| 2 H | HDPE + 15% TOPAS COC-110 | 24.5 | 7.0 | 14 | 8 | 32 |

Both HDPE and HDPE+15% COC-110 had highest mean failure height, X, and maximum passing height, and fewest failures. COC-110 did not adversely affect drop impact resistance of HDPE, but, marginally improved it. Impact using a horizontal drop orientation is much more demanding on the container than vertical drop orientation.

Top Load

For each bottle composition, Topload or compression strength was measured using an Instron testing instrument. Twelve bottles were tested empty as a vented container at a test speed of 2"/min. Force was recorded at 1 inch total deflection. The maximum load for each bottle was recorded. Averaged values are summarized in Table 23.

TABLE 23

Topload Test Results

| Sample ID # | Preform/Bottle | Empty, vented Topload (lb$_f$) |
|---|---|---|
| 2 A | Neat HDPE Total SB1359 | 29.4 ± 0.9 |
| 2 D | HDPE + 10% TOP AS COC-65 | 23.5 ± 2.0 |
| 2 E | HDPE + 15% TOP AS COC-65 | 18.3 ± 3.4 |
| 2 H | HDPE + 15% TOP AS COC-110 | 35.6 ± 3.6 |

Addition of 15% TOPAS COC-110 to HDPE improved top load force of HDPE. TOPAS COC-65 was not as effective. Top load needs vary widely, depending on many factors for specific applications. Expected top load resistances range from 10 lb$_f$-80 lb$_f$ so 29-35 lb$_f$ would likely be an acceptable level for many bottle filling & handling systems. The wall thickness impacts this performance. Adjustments to material distribution will likely affect these results.

Example Series 3: Defining Reheat Stretch Blow-Molding Process Window

In Example Series 3, 15 and 17 weight percent COC-110 is added to HDPE. This study shows how well COC, with glass transition temperature of 110° C., broadens the reheat stretch blow-molding process window for HDPE. Preforms were molded on Arburg 320 M. The plasticating unit was outfitted with 35-mm mixing screw and mixing tip to provide good melt mixing and homogenization of the COC and HDPE pellets. Preform injection molding conditions are summarized in Table 24. These conditions are similar to the ones used to mold preforms in Example Series 2.

TABLE 24

Preform Injection Molding Conditions

| | Sample ID# | | |
|---|---|---|---|
| Variable Description | 3 A SB1359 + 15% TOPAS COC-110 COC | 3 B SB1359 + 17% TOPAS COC-110 COC | 3 C HDPE SB1359 |
| Preform Wt. (g) | 31.7 | 31.8 | 31.1 |
| Mold Temp (° F.) | 60 | 60 | 60 |
| Feed (° C.) | 220 | 220 | 220 |
| Zone 2 (° C.) | 230 | 230 | 230 |
| Zone 3 (° C.) | 230 | 230 | 230 |
| Zone 4 (° C.) | 230 | 230 | 230 |
| Nozzle (° C.) | 240 | 240 | 240 |
| Injection Press, (bar) | 1000 | 1000 | 1000 |
| Injection Time (sec) | 4.5 | 4.5 | 4.5 |
| 1$^{st}$ Injection Speed (ccm/sec) | 12.0 | 12.0 | 12.0 |
| 2$^{nd}$ Injection Speed (ccm/sec) | 10.0 | 10.0 | 10.0 |
| Holding Pressure | | | |
| Switch-Over Point (ccm) | 6.5 | 6.5 | 6.5 |
| 1st Hold Pressure (bar) | 250.0 | 250.0 | 250.0 |
| 1st Hold Pr. Time (sec) | 3.5 | 3.5 | 3.5 |
| Remain Cool Time (sec) | 12.0 | 12.0 | 12.0 |
| Dosage | | | |
| Circumf. Speed (m/min) | 8.0 | 8.0 | 8.0 |
| Back Pressure (bar) | 25.0 | 25.0 | 25.0 |
| Dosage Volume (ccm) | 47.0 | 47.0 | 47.0 |
| Dosage Time (sec) | 10.5 | 10.5 | 10.8 |
| Cushion (ccm) | 2.1 | 2.1 | 1.6 |
| Cycle Time (sec) | 24.8 | 24.8 | 24.8 |
| Fill Time (sec) | 4.5 | 4.5 | 4.5 |

Optimized blow-molding conditions are shown in Table 25. The bottles were blown with preforms placed on every other spindle using Sidel SBO1 reheat stretch blow-molding machine. The number of blowouts and off-center bottles increased significantly when preforms were placed on every spindle. Unlike transparent PET preforms, HDPE and HDPE+ COC preforms are opaque, which reflects IR heat randomly between adjacent preforms. This heat reflection causes subtle, but significant non-uniform preform heating, which causes bottles to blowout during blow-molding or blow into a completed bottle, but off-centered, which increases wall thickness variation around the circumference of the bottle. By mounting preforms on to alternating spindles, sufficient space, equivalent to 1.5 preform diameter, reduces the amount of reflected heat created by the proximity of hot adjacent preforms. Overall, HDPE-COC blends showed considerably less combined failures on a percentage basis than neat HDPE. SB1359 experienced significantly more off centered gates compared to the COC variables.

Speed of the spindle chain, which moves through the IR reheat oven, controls process rate. Placement of preforms on ever other spindle reduces the effective process rate from 800 to 400 bottles per hour. Process yield depends on amount of failure which occur during a fixed amount of time or number of preforms tested. Two of the most common failures are blow-outs and off-center gate. Blow outs are caused by pressurized air used to blow the container into the shape of the tool that prematurely ruptures through the wall of the preform or partly blown bottle. There are multiple potential causes for blow-outs. Off-center gate occurs when the push rod does not contact the bottom of the preform precisely at the center corresponding to the location of the injection molded sprue. There are multiple potential causes for off-center gate. On a percentage basis, HDPE+15% COC-110 had 37%, HDPE+17% COC-110 had 32% and HDPE had 61% total failures. Addition of COC, particularly one with glass transition temperature at or about 110° C., provides HDPE with more stability during the reheat blow-molding process to significantly increase production yield and reduce total in-process failures. Both HDPE-COC bottles were made at overall all power input of 68, average temperature of each preform measuring 117 and 119° C. It is possible defect rates could be reduced if bottles were blown using warmer preform temperature, based on the following process window determination.

TABLE 25

Bottle Blow-Molding Conditions

| | Sample ID # | | |
|---|---|---|---|
| Resin | 3 A SB1359 + 15% TOPAS COC-110 | 3 B SB1359 + 17% TOPAS COC-110 | 3 C SB1359 |
| Speed (bottle per hour) | 400 | 400 | 400 |
| Overall Power Input | 68 | 68 | 70 |
| Oven Lamp Settings | | | |
| Zone 7 | 82 | 82 | 94 |
| Zone 6 | 82 | 82 | 94 |
| Zone 5 | 45 | 45 | 43 |
| Zone 4 | 82 | 82 | 80 |
| Zone 3 | 47 | 47 | 45 |
| Zone 2 | 35 | 35 | 35 |
| Zone 1 | 40 | 40 | 40 |
| Stretching Speed | 1.45 | 1.45 | 1.45 |
| Preform Temp. (° C.) | 116 | 119 | 117 |

TABLE 25-continued

Bottle Blow-Molding Conditions

| | Sample ID # | | |
|---|---|---|---|
| Resin | 3 A<br>SB1359 +<br>15% TOPAS<br>COC-110 | 3 B<br>SB1359 +<br>17% TOPAS<br>COC-110 | 3 C<br>SB1359 |
| Blow Timing/Pressures | | | |
| Cycle Time (sec) | 2.81 | 2.81 | 2.81 |
| Low Blow Position (mm) | 210 | 210 | 210 |
| Low Pressure (bar) | 5.5 | 5.5 | 5.5 |
| High Blow Position (mm) | 335 | 335 | 335 |
| High Blow Pressure (bar) | 25.0 | 25.0 | 25.0 |
| Pre-blow Flow (bar) | 3.0 | 3.0 | 3.0 |
| Body Mold Temp (° F.) | 45 | 45 | 45 |
| Base Mold Temp. (° F.) | 45 | 45 | 45 |
| Top Weight (g) | 9.7 | 10.2 | — |
| Panel Weight (g) | 14.1 | 13.7 | — |
| Base Weight (g) | 7.8 | 7.8 | — |
| Blowouts/off-center/<br>bottles made | 14 BO/24<br>OC/102 | 2 BO/30<br>OC/100 | 0 BO/32<br>OC/52 |

Figure 12:
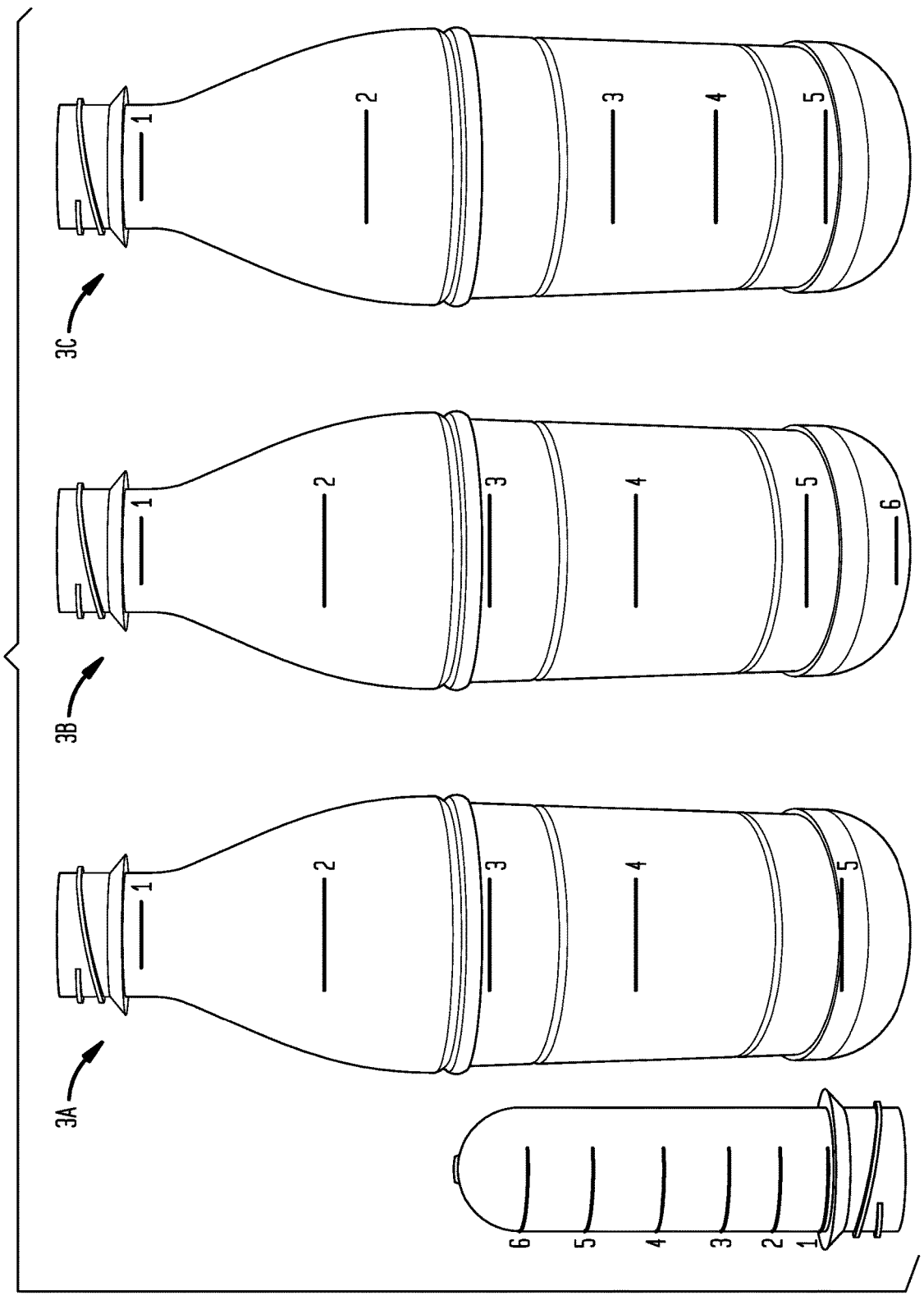
FIG. 12 is a drawing showing a scribed preform and illustrating material distribution in ISBM bottles made from preforms of melt-blends of bimodal HDPE/COC and bimodal HDPE alone.

Representations of a line scribed preform and bottles are having lines indicating the position of material relative to the scribed preform shown in FIG. 12. Bottles with COC show more uniform material distribution—more even spread between scribed lines than the one without COC.

It is seen in FIG. 12 that the COC/HDPE bottles exhibited much more uniform material distribution in the final product. The unexpectedly superior processing characteristics are also reflected in the relative breadth of the processing window, discussed below.

Reheat stretch blow-molding has a process window defined by the amount of overall power used by IR heaters to reheat the preform and preform temperature, as measured by IR thermocouple at the oven exit. Bottles were cut with hot wire into three sections and weighed. Section weights reveal how material is distributed. Changes to section weights are usually small at each overall power setting and pre-form temperature increment. However, as the pre-form temperature increases, toward the crystalline melting point of HDPE, section weights become skewed to the top, suggesting HDPE-COC blend cannot stretch evenly. The process window for HDPE with 15% COC-110 is shown in Table 26.

TABLE 26

Process window for HDPE with 15% COC-110 (3A)

| Overall<br>Power (%) | Preform<br>Temperature (C.) | Top<br>Wt.<br>(g) | Panel<br>Wt.<br>(g) | Base<br>Wt.<br>(g) |
|---|---|---|---|---|
| 62 | 116 | — | — | — |
| 64 | 116 | 9.2 | 13.7 | 8.7 |
| 66 | 117 | 9.2 | 13.9 | 8.5 |
| 68 | 117 | 9.2 | 14.1 | 7.8 |
| 70 | 120 | 10.0 | 13.7 | 8.0 |
| 72 | 122 | 10.9 | 13.1 | 7.8 |
| 74 | 124 | 11.4 | 12.7 | 7.4 |
| 76 | 126 | 13.0 | 11.8 | 6.8 |
| 78 | 129 | 13.0 | 11.8 | 6.8 |
| 80 | 132 | 14.7 | 11.1 | 5.9 |
| 82 | 136 | 15.4 | 10.6 | 5.5 |
| 84 | 136 | 16.0 | 10.2 | 5.3 |
| 86 | 140 | — | — | — |

The process window for HDPE with 17% COC-110 is shown in Table 27.

TABLE 27

Process window for HDPE with 17% COC-110 (3B)

| Overall<br>Power (%) | Preform<br>Temperature (C.) | Top<br>Wt.<br>(g) | Panel<br>Wt.<br>(g) | Base<br>Wt.<br>(g) |
|---|---|---|---|---|
| 62 | 115 | — | — | — |
| 64 | 116 | 10.9 | 13.6 | 7.1 |
| 66 | 118 | 10.5 | 13.8 | 7.4 |
| 68 | 119 | 10.2 | 13.7 | 7.8 |
| 70 | 121 | 10.7 | 13.3 | 7.7 |
| 72 | 122 | 11.4 | 12.8 | 7.4 |
| 74 | 125 | 12.6 | 12.0 | 7.1 |
| 76 | 129 | 13.8 | 11.7 | 6.2 |
| 78 | 133 | 14.6 | 11.4 | 5.7 |
| 80 | 134 | 14.8 | 11.1 | 5.7 |
| 82 | 136 | 16.3 | 10.5 | 5.0 |
| 84 | 141 | — | — | — |

Figure 13A:
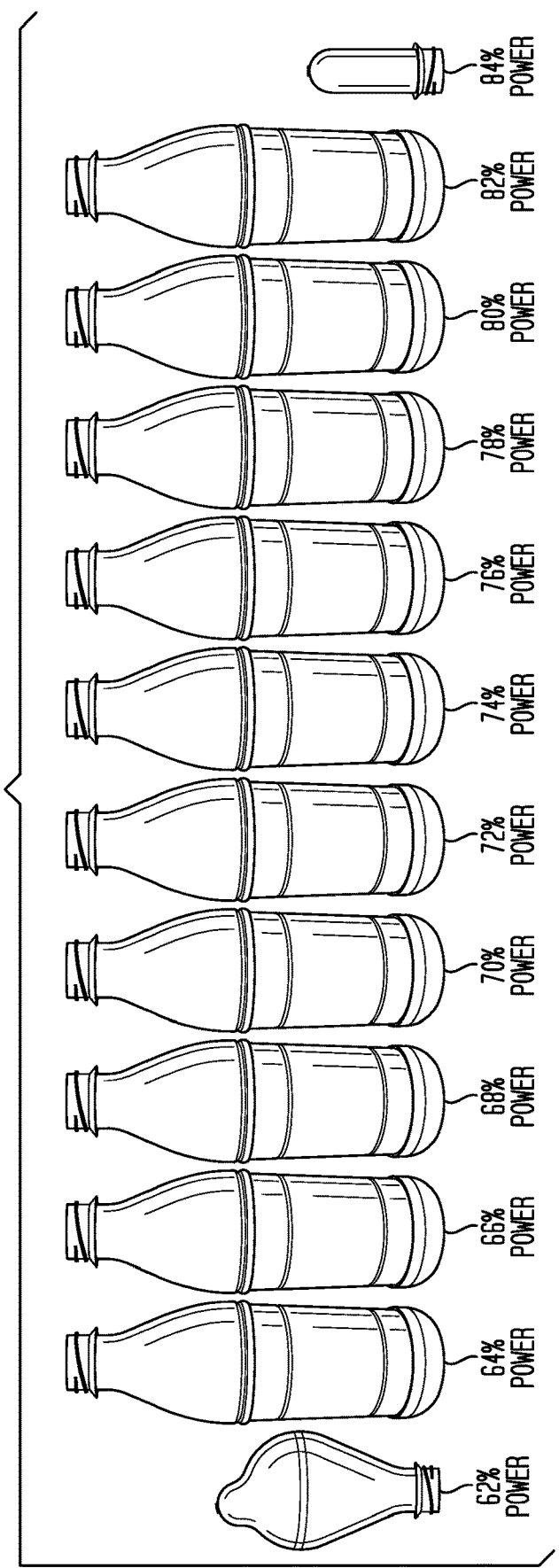
FIGS. 13A and 13B is an illustration comparing the processing windows of bimodal HDPE/COC preforms and preforms consisting of bimodal HDPE.

Representations of the bottles collected during the process window investigations for HDPE with 17% COC-110 (3 B) is shown in FIG. 13A.

Process window for neat HDPE is shown in Table 28.

TABLE 28

Process window for HDPE S B1359 (3 C)

| Overall<br>Power (%) | Preform<br>Temperature (C.) | Top<br>Wt.<br>(g) | Panel<br>Wt.<br>(g) | Base<br>Wt.<br>(g) |
|---|---|---|---|---|
| 68 | 117 | — | — | — |
| 70 | 117 | | Not cut | |
| 72 | 117 | | | |
| 74 | 117 | — | — | — |

Figure 13B:
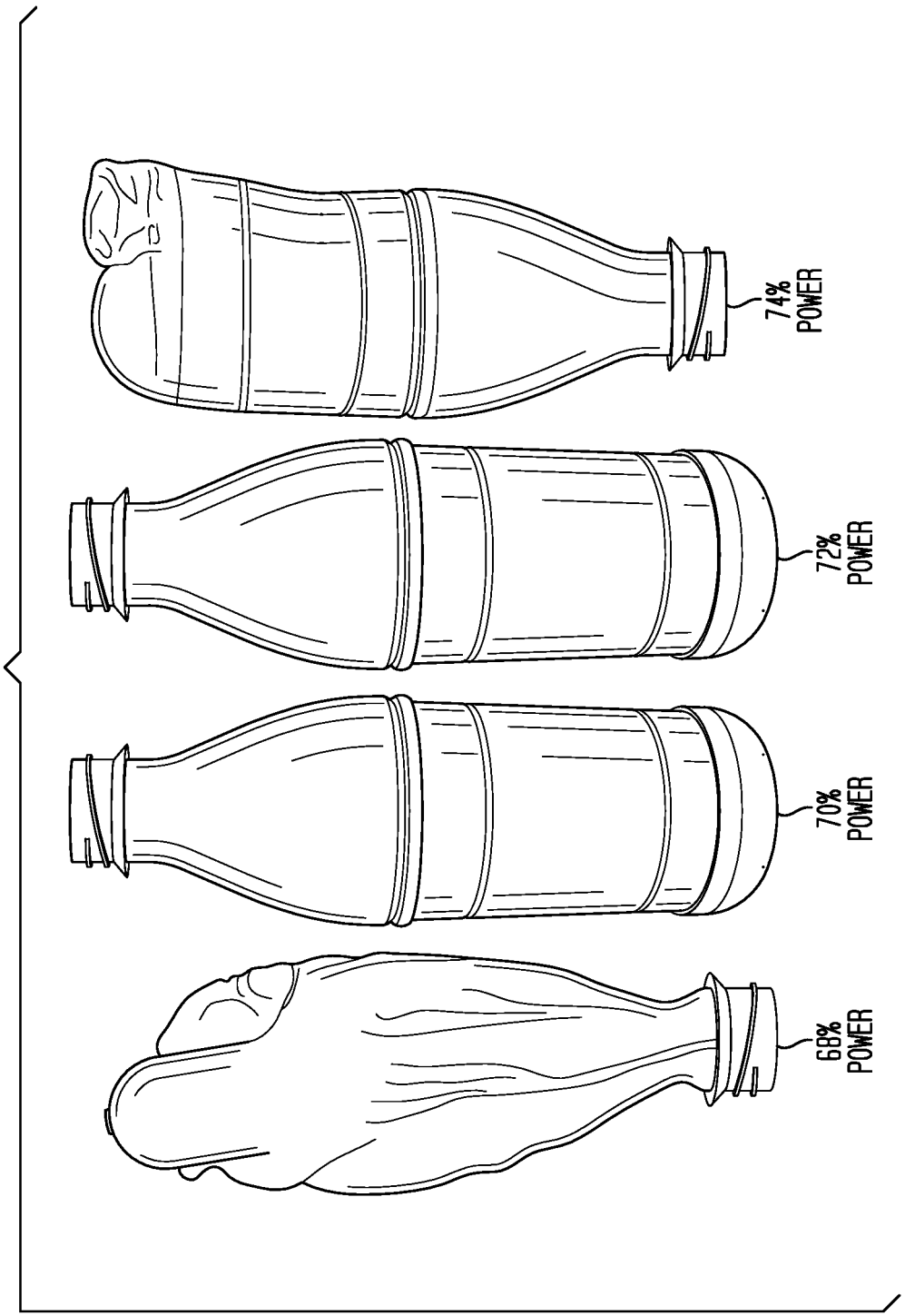

Representations of the bottles collected during the process window investigations for HDPE (3 C) is shown in FIG. 13B.

To confirm material distribution, wall thickness of the bottles molded at the described in Table 25 were measured with a Magna-Mike. Wall thicknesses distribution is shown in Table 29.

TABLE 29

Wall Thickness (mil)

| | Sample ID # | | |
|---|---|---|---|
| Height<br>(inch) | 3 B<br>HDPE + 17%<br>TOPAS<br>COC-110 | 3 A<br>HDPE + 15%<br>TOPAS<br>COC-110 | 3 C<br>TOTAL<br>HDPE<br>SB1359 |
| 8.01 | 15 | 13 | 11 |
| 6.92 | 12 | 13 | 10 |
| 5.06 | 18 | 23 | 13 |
| 4.14 | 21 | 23 | 16 |
| 2.55 | 21 | 18 | 36 |
| 1.59 | 17 | 17 | 22 |
| 1.04 | 15 | 17 | 18 |
| 0.35 | 16 | 21 | 22 |
| Average | 16.9 | 18.1 | 18.5 |
| Standard<br>Deviation | 3.1 | 4.0 | 8.4 |

Figure 1B:
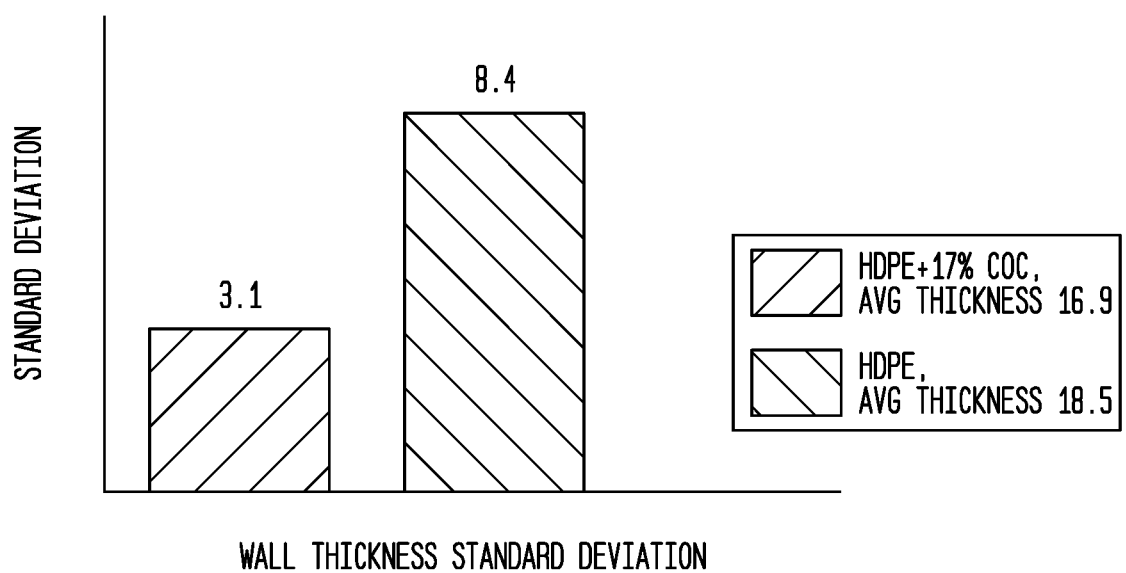
FIG. 1B is a histogram of standard deviation in wall thickness for an ISBM container comprising 17 wt % COC and 83 wt % bimodal HDPE, as well as standard deviation in wall thickness for an ISBM container consisting of bimodal HDPE.

The standard deviations in wall thickness and processing windows for HDPE and HDPE/COC are illustrated in FIG. 1.

Standard deviation for both HDPE-COC compositions is less than half of that of neat HDPE SB1359. Bottles made from HDPE with 17% COC-110 has much less (nearly one third) of the variation in wall thickness than bottles made with neat HDPE SB1359, demonstrating that COC-110 has the ability to enable HDPE stretch and blow uniformly during reheat stretch blow-molding processes.

In Example Series 3, both HDPE and HDPE-COC compositions had similar mean failure height, X, and maximum passing height, between 50 and 60 inches. As in Example Series 1 and 2, COC-110 did not adversely affect drop impact resistance of HDPE. Test conditions are the same, 4° C., horizontal impact bottle orientation. Bruceton staircase drop impact testing results are summarized in Table 30.

TABLE 30

Bruceton Staircase Drop Impact Test for Example Series 3

| Sample | Preform/Bottle | X (in.) | σ (in.) | C (in.) | N | Max. Passing |
|---|---|---|---|---|---|---|
| 3 A | SB1359 + 15% COC-HO | 60.6 | 8.4 | 54 | 10 | 60 |
| 3 B | SB1359 + 17% COC-HO | 50.4 | 7.0 | 42 | 10 | 54 |
| 3 C | SB1359 | 57.5 | 2.3 | 50 | 4 | 56 |

As observed in Example Series 2, the majority of bottle failures in this Example Series 3 occurred primarily in the upper shoulder seam, which is formed along the parting line between blow-mold halves.

It is appreciated from the foregoing Examples that alicyclic polyolefin compositions dramatically and unexpectedly enhance injection stretch blow-molding characteristics of semi-crystalline polymers. Among the most dramatic effects are increases in processing window and uniformity of material distribution in the ISBM container.

The ISBM containers of the invention also exhibit superior optical properties in terms of see-through and contact clarity, gloss and so forth. In addition to the partially crystalline polyolefin and and alicyclic polyolefin, suitable additives and additional components are used depending upon processing considerations and the desired end-product. Examples of such additives and additional components include dyes, pigments and other coloring agents and/or opacifiers, clarifiers, ultraviolet light absorbers and stabilizers, organic or inorganic fillers including particulate and fibrous fillers, reinforcing agents, nucleators, plasticizers, waxes, melt adhesives, crosslinkers or vulcanizing agents oxidative and thermal stabilizers, lubricants, release agents, oxidation inhibitors, oxidation scavengers, neutralizers and combinations thereof depending on the specific application.

While the invention has been described in detail, modifications within the spirit and scope of the invention will be readily apparent to those of skill in the art. In view of the foregoing discussion, relevant knowledge in the art and references including patents, patent applications and literature references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A method of making an ISBM container comprising:
    (a) preparing a preform by injection molding the preform which comprises from 70 wt. % to 85 wt. % of a semi-crystalline polyolefin polymer composition comprising polymers selected from polyethylene polymers and polypropylene polymers and from 15 wt. % to 30 wt. % of an alicyclic polyolefin composition characterized by a glass transition temperature, Tg; and
    (b) concurrently stretching and blow-molding the preform into the ISBM container at a blow-molding temperature,
wherein the blow-molding temperature is:
    (i) below the melting temperature of the polyolefin polymer composition and (ii) above the glass transition temperature, Tg, of the alicyclic polyolefin composition; and
wherein the ISBM container is characterized by an axial stretch ratio of from 1.75:1 to 3.25:1 with respect to the preform as well as a blow-up ratio of from 4.0:1 to 9.0:1 with respect to the preform.

2. The method of claim 1, wherein the blow-molding temperature is from 2.5° C. to 40° C. above the glass transition temperature, Tg, of the alicyclic polyolefin composition.

3. The method of claim 2, wherein the blow-molding temperature is from 5° C. to 25° C. above the glass transition temperature, Tg, of the alicyclic polyolefin composition.

4. The method of claim 1, wherein said semi-crystalline polyolefin composition comprises HDPE.

5. The method of claim 4, wherein the HDPE is a bimodal HDPE.

6. The method of claim 1, wherein the alicyclic polyolefin composition is an amorphous alicyclic polyolefin composition.

7. The method of claim 1, wherein the alicyclic polyolefin composition is an amorphous cycloolefin polymer composition.

8. The method of claim 7, wherein the amorphous cycloolefin polymer composition comprises a norbornene/ethylene copolymer.

9. The method of claim 8, wherein the ISBM container comprises from 10 wt. % to 20 wt. % of a norbornene/ethylene copolymer.

10. The method of claim 8, wherein the blow molding temperature is from about 115° C. to about 140° C.

11. The method of claim 8, wherein the ISBM container exhibits a wall thickness standard deviation of less than 50% as compared to a standard deviation in wall thickness of a like ISBM container formed under the same conditions from an identical preform formed of the semi-crystalline polyolefin polymer composition only.

12. A method of making an ISBM container comprising:
    (a) preparing a preform by injection molding the preform which comprises from 70 wt. % to 85 wt. % of a semi-crystalline polyolefin polymer composition comprising polymers selected from polyethylene polymers and polypropylene polymers and from 15 wt. % to 30 wt. % of an amorphous alicyclic polyolefin composition comprising a norbornene/ethylene copolymer characterized by a glass transition temperature, Tg; and
    (b) concurrently stretching and blow-molding the preform into the ISBM container at a blow-molding temperature, wherein the blow-molding temperature is:
  (i) below the melting temperature of the polyolefin polymer composition and (ii) above the glass transition temperature, Tg, of the alicyclic polyolefin composition; and
  wherein the ISBM container is characterized by an axial stretch ratio of from 1.75:1 to 3.25:1 with respect to the preform as well as a blow-up ratio of from 4.0:1 to 9.0:1 with respect to the preform; and
wherein the ISBM container comprises at least 15 wt. % of a norbornene/ethylene copolymer.

* * * * *